United States Patent
Belleschi et al.

(10) Patent No.: US 10,440,581 B2
(45) Date of Patent: Oct. 8, 2019

(54) INTER-CARRIER D2D RESOURCE ALLOCATION

(71) Applicant: TELEFONAKTIEBOLAGET L M ERICSSON (PUBL), Stockholm (SE)

(72) Inventors: Marco Belleschi, Solna (SE); Stefano Sorrentino, Solna (SE); Ricardo Blasco Serrano, Stockholm (SE); Hieu Do, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 30 days.

(21) Appl. No.: 15/573,628

(22) PCT Filed: Apr. 20, 2016

(86) PCT No.: PCT/IB2016/052247
§ 371 (c)(1),
(2) Date: Nov. 13, 2017

(87) PCT Pub. No.: WO2016/181240
PCT Pub. Date: Nov. 17, 2016

(65) Prior Publication Data
US 2018/0167820 A1    Jun. 14, 2018

Related U.S. Application Data

(60) Provisional application No. 62/160,912, filed on May 13, 2015.

(51) Int. Cl.
*H04W 16/10* (2009.01)
*H04W 76/23* (2018.01)
*H04W 72/02* (2009.01)
*H04W 28/02* (2009.01)
*H04W 72/12* (2009.01)

(52) U.S. Cl.
CPC ....... *H04W 16/10* (2013.01); *H04W 28/0215* (2013.01); *H04W 72/02* (2013.01); *H04W 72/1278* (2013.01); *H04W 76/23* (2018.02); *H04W 72/121* (2013.01)

(58) Field of Classification Search
CPC .... H04L 12/6418; H04L 29/06; H04W 16/14; H04W 28/26; H04W 60/00
See application file for complete search history.

(56) References Cited

U.S. PATENT DOCUMENTS 10,165,433 B2 * 12/2018 Matsumoto ........... H04L 1/1893

OTHER PUBLICATIONS

Ericsson "Direct Discovery transmission on non-serving carriers", 3GPP TSG-RAN WG2 #89bis; Tdoc R2-151149, Apr. 2015.
NTT Docomo, Inc., "Enhancement for Inter-carrier D2D Discovery", 3GPP TSG RAN WG2 89bis, R2-151423, Apr. 2015.

(Continued)

*Primary Examiner* — Chandrahas B Patel

(57) ABSTRACT

A method in a wireless device is disclosed. The method comprises determining one or more time resources in a particular carrier from one or more pools of time resources for a sidelink operation by the wireless device. The method comprises sending a gap request message to a network node, the gap request message indicating one or more gaps requested by the wireless device, the one or more gaps comprising the determined one or more time resources for the sidelink operation.

40 Claims, 12 Drawing Sheets

(56) References Cited

OTHER PUBLICATIONS

Kyocera, "Inter-frequency and inter-PLMN D2D discovery", 3GPP TSG-RAN WG2 #87bis; R2-144534, Oct. 2014.
Nokia Networks, "Clarification of multi-carrier scenario for direct communication", 3GPP TSG-RAN WG2 #89bis; R2-151579, Apr. 2015.

* cited by examiner

INTER-CARRIER D2D RESOURCE ALLOCATION

RELATED APPLICATIONS

This application is a national phase of Patent Cooperation Treaty (PCT) patent application No. PCT/IB2016/052247, filed Apr. 20, 2016, which claims priority to U.S. provisional patent application Ser. No. 62/160,912, filed May 13, 2015, the disclosures of which are hereby incorporated herein by reference in their entireties.

TECHNICAL FIELD

The present disclosure relates, in general, to wireless communications and, more particularly, inter-carrier device-to-device resource allocation.

BACKGROUND

Recent developments have allowed local device-to-device (D2D) communication to (re)use cellular spectrum resources simultaneously with ongoing cellular traffic. In general, non-orthogonal resource sharing between cellular and D2D layers has the potential of reuse gain and proximity gain, while at the same time increasing resource utilization. Consequently, D2D communications underlying cellular networks have received considerable interest in recent years.

In 3GPP Long Term Evolution (LTE) networks, such LTE Direct (D2D) communication can be used in commercial applications, such as cellular network offloading, proximity based social networking, or in public safety situations in which first responders need to communicate with each other and with people in a disaster area (per 3GPP TR 22.803).

FIG. 1 is a diagram illustrating an example LTE network. A communication network 100 comprises a plurality of wireless devices 110 (e.g., conventional user equipment (UEs), machine type communication (MTC)/machine-to-machine (M2M) UEs) and a plurality of network nodes 115 (e.g., radio access nodes such as eNodeBs (eNBs) or other base stations). Communication network 100 is organized into cells 125, which are connected to core network 120 via corresponding network nodes 115. Network nodes 115 are capable of communicating with wireless devices 110 along with any additional elements suitable to support communication between wireless devices 110 or between a wireless device 110 and another communication device (such as a landline telephone).

D2D communication entities using an LTE Direct link may reuse the same physical resource blocks (PRBs) (i.e., time/frequency resources) used for cellular communications either in the downlink (DL), in the uplink (UL), or both. The reuse of radio resources in a controlled fashion can lead to the increase of spectral efficiency at the expense of some increase of the intra-cell interference.

Typically, D2D communicating entities (e.g., wireless devices 110) use UL resources such as UL PRBs or UL time slots, but conceptually it is possible that D2D (LTE Direct) communications take place in the cellular DL spectrum or in DL time slots. For convenience, the following description presents various embodiments in which D2D links use UL resources, such as UL PRBs in a Frequency-Division-Duplex (FDD) or UL time slots in a cellular Time-Division-Duplex (TDD) system, but the described concepts are applicable to cases in which D2D communications take place in DL spectrum as well.

In certain scenarios, network node 115 (for example, a control node such as an eNB) assigns resources to each wireless device 110 for D2D operation, and in other scenarios wireless devices 110 control directly at least some of the transmission resources used for D2D transmission. Distributed resource allocation schemes may be used in the latter case, with reduced signaling and dependency on network node 115 as compared to centralized resource allocation. In distributed schemes, wireless devices 110 are typically constrained to use resources belonging to a possibly periodic resource pool, typically consisting of a set of time and frequency resources.

The 3GPP standardization body defines two different types of services for D2D communications: (1) Direct Communication where wireless devices 110 in proximity of each other establish a direct user plane connection; and (2) Direct Discovery where wireless devices 110 transmit and monitor discovery announcement to become aware of the type of content/service each wireless device 110 can share in D2D fashion, as well as the proximity between each other. When performing direct communications, 3GPP defines two different operative modes: (1) Mode 1, in which a wireless device 110 in RRC_CONNECTED mode requests D2D resources and network node 115 grants them; and (2) Mode 2, where a wireless device 110 (potentially in RRC_IDLE) autonomously selects resources for transmission.

Similarly, for direct discovery, 3GPP considers Type 1 in which wireless devices 110 autonomously select radio resources for discovery, and Type 2 in which wireless devices 110 in RRC CONNECTED request resources for discovery and network node 115 grants them via radio resource control (RRC).

D2D communication within LTE should be able to work also inter-Public-Land-Mobile-Network (PLMN) (as well as intra-PLMN both inter-frequency and intra-frequency). Therefore, according to one example a wireless device 110 operating under a first operator subscription on a first carrier frequency should be able to discover (and in a later stage also communicate to) a second wireless device 110 operating under a second operator subscription on a second carrier frequency.

The performance of multi-carrier D2D wireless devices 110 may be improved in different ways in terms of discovery latency, discovery probability and energy efficiency. With multi-carrier D2D, a configuration is intended where a wireless device 110 performs D2D transmission and/or reception on one carrier while it is also configured to perform cellular or other communications (including other D2D communications) on another carrier. Such carriers may or may not be managed by the same network node 115 and/or network operator. Additionally, such carriers may also be specially preconfigured carriers that wireless device 110 monitors but that are not directly managed by any network infrastructure, meaning that the network cannot provide system information for that carrier or assign transmission resources. These carriers are referred to as out-of-coverage carriers, and wireless device 110 has to autonomously select transmission resources (Mode 1/Type 2) from a resource pool in order to transmit.

Potential benefits of multi-carrier D2D communications are manifold. For example, because D2D communication exploits the ordinary cellular spectrum, it may be important to better exploit available carriers to limit the impact on the quality of service of the cellular layer. This feature could allow a better load distribution among carriers and eventually an increased quality of service (QoS) for both cellular and D2D communications. Additionally, having multiple carriers available for D2D communications widens the range of services/applications that the D2D technology can satisfy (e.g., it gives the possibility to deploy dedicated carriers for specific services).

SUMMARY

To address the foregoing problems with existing approaches, disclosed is a method in a wireless device. The method comprises determining one or more time resources in a particular carrier from one or more pools of time resources for a sidelink operation by the wireless device. The method comprises sending a gap request message to a network node, the gap request message indicating one or more gaps requested by the wireless device, the one or more gaps comprising the determined one or more time resources for the sidelink operation.

In certain embodiments, the sidelink operation by the wireless device may comprise at least one of: receiving a sidelink transmission; and transmitting a sidelink transmission. In certain embodiments, the gap request message may be sent within a predefined time period preceding a repetition of at least one of the one or more pools of time resources. The gap request message may comprise one or more of: a purpose or application of the sidelink operation; a priority related parameter; a signal type for the sidelink operation; a type of traffic for the sidelink operation; and a carrier to which the gap applies.

In certain embodiments, the method may comprise receiving a positive acknowledgement from the network node, the positive acknowledgement indicating that the wireless device may proceed with the sidelink operation. In certain embodiments, the method may comprise receiving a negative acknowledgement from the network node, the negative acknowledgement indicating that the wireless device shall prioritize one or more uplink transmissions to the network node over the sidelink operation. The method may comprise receiving a resource allocation configuration from the network node, the resource allocation configuration based at least in part on the one or more gaps requested by the wireless device in the gap request message. The resources allocation configuration received from the network node may apply to the wireless device until otherwise indicated by the network node.

In certain embodiments, the method may comprise sending capability information to the network node, the capability information indicating that the wireless device is capable of indicating one or more time resources in the particular carrier from the one or more pools of time resources for the sidelink operation by the wireless device. In certain embodiments, the method may comprise sending an indication to the network node that the wireless device is no longer using the requested one or more gaps. In certain embodiments, the one or more pools of time resources for the sidelink operation may be periodic, and the gap request message may comprise an index indicating the one or more resources from the one or more resource pools to be used by the wireless device in one or more subsequent sidelink periods.

Also disclosed is a wireless device. The wireless device comprises one or more processors. The one or more processors are configured to determine one or more time resources in a particular carrier from one or more pools of time resources for a sidelink operation by the wireless device. The one or more processors are configured to send a gap request message to a network node, the gap request message indicating one or more gaps requested by the wireless device, the one or more gaps comprising the determined one or more time resources for the sidelink operation.

Also disclosed is a method in a wireless device. The method comprises determining one or more time resources in a particular carrier from one or more pools of time resources for a sidelink transmission by the wireless device. The method comprises determining whether an uplink grant for scheduling an uplink transmission is received from a network node during a predefined period, the predefined period comprising a period of time preceding the sidelink transmission. The method comprises performing at least one of: upon determining that the uplink grant was received during the predefined period, aborting the sidelink transmission; and upon determining that the uplink grant was not received during the predefined period, transmitting the sidelink transmission.

In certain embodiments, the predefined period may comprise a period of time during which reception of an uplink grant would lead to an uplink transmission that would collide with the sidelink transmission. In certain embodiments, aborting the sidelink transmission may comprise at least one of: postponing the sidelink transmission to a later occasion; and selecting one or more different time resources from the one or more pools of time resources that would not collide with the uplink transmission scheduled by the network node. In certain embodiments, upon determining that the uplink grant was received during the predefined period, the method may further comprise performing the uplink transmission scheduled by the uplink grant received from the network node.

Also disclosed is a wireless device. The wireless device comprises one or more processors. The one or more processors are configured to determine one or more time resources in a particular carrier from one or more pools of time resources for a sidelink transmission by the wireless device. The one or more processors are configured to determine whether an uplink grant for scheduling an uplink transmission is received from a network node during a predefined period, the predefined period comprising a period of time preceding the sidelink transmission. The one or more processors are configured to perform at least one of: upon determining that the uplink grant was received during the predefined period, abort the sidelink transmission; and upon determining that the uplink grant was not received during the predefined period, transmit the sidelink transmission.

Also disclosed is a method in a network node. The method comprises receiving a gap request message from a wireless device indicating one or more gaps requested by the wireless device, the one or more gaps comprising one or more time resources selected from one or more pools of time resources for a sidelink operation by the wireless device. The method comprises determining an allocation of resources for the wireless device based at least in part on the one or more gaps indicated in the received gap request message.

In certain embodiments, the gap request message may be received within a predefined time window preceding a repetition of at least one of the one or more pools of time resources. In certain embodiments, the gap request message may further comprise one or more of: a purpose or application of the sidelink operation; a priority related parameter; a signal type for the sidelink operation; a type of traffic for the sidelink operation; and a carrier to which the gap applies.

In certain embodiments, the method may further comprise sending, in response to the gap request message from the wireless device, a positive acknowledgement indicating that the wireless device may proceed with the sidelink operation.

In certain embodiments, the method may further comprise sending, in response to the gap request message from the wireless device, a negative acknowledgement indicating that the wireless device shall prioritize one or more uplink transmissions to the network node over the sidelink operation.

In certain embodiments, the method may further comprise allocating resources for the wireless device according to the determined allocation of resources, wherein allocating resources for the wireless device may comprise one or more of: sending a resource allocation configuration to the wireless device, the resource allocation configuration based at least in part on the one or more gaps requested by the wireless device in the gap request message; scheduling resources on at least one carrier for the wireless device that would not collide with the one or more time resources selected for the sidelink operation by the wireless device; and scheduling resources to avoid resources preceding and following the one or more time resources selected for the sidelink operation by the wireless device.

In certain embodiments, the method may further comprise receiving capability information from the wireless device, the capability information indicating that the wireless device is capable of indicating one or more time resources in the particular carrier from the one or more pools of time resources for the sidelink operation by the wireless device. In certain embodiments, the method may further comprise receiving an indication that the wireless device is no longer using the requested one or more gaps. In certain embodiments, the pool of time resources may be periodic, and the gap request message may further comprise an index indicating the one or more resources from the one or more resource pools to be used by the wireless device in one or more subsequent sidelink periods.

Also disclosed is a network node. The network node comprises one or more processors. The one or more processors are configured to receive a gap request message from a wireless device indicating one or more gaps requested by the wireless device, the one or more gaps comprising one or more time resources selected from one or more pools of time resources for a sidelink operation by the wireless device. The one or more processors are configured to determine an allocation of resources for the wireless device based at least in part on the one or more gaps indicated in the received gap request message.

Certain embodiments of the present disclosure may provide one or more technical advantages. For example, certain embodiments may advantageously reduce the length of interruptions of UL transmissions in conjunction with multi-carrier D2D communication. As another example, certain embodiments may advantageously allow a wireless device to efficiently time-share its transmitter chains between D2D and cellular uplink transmission. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
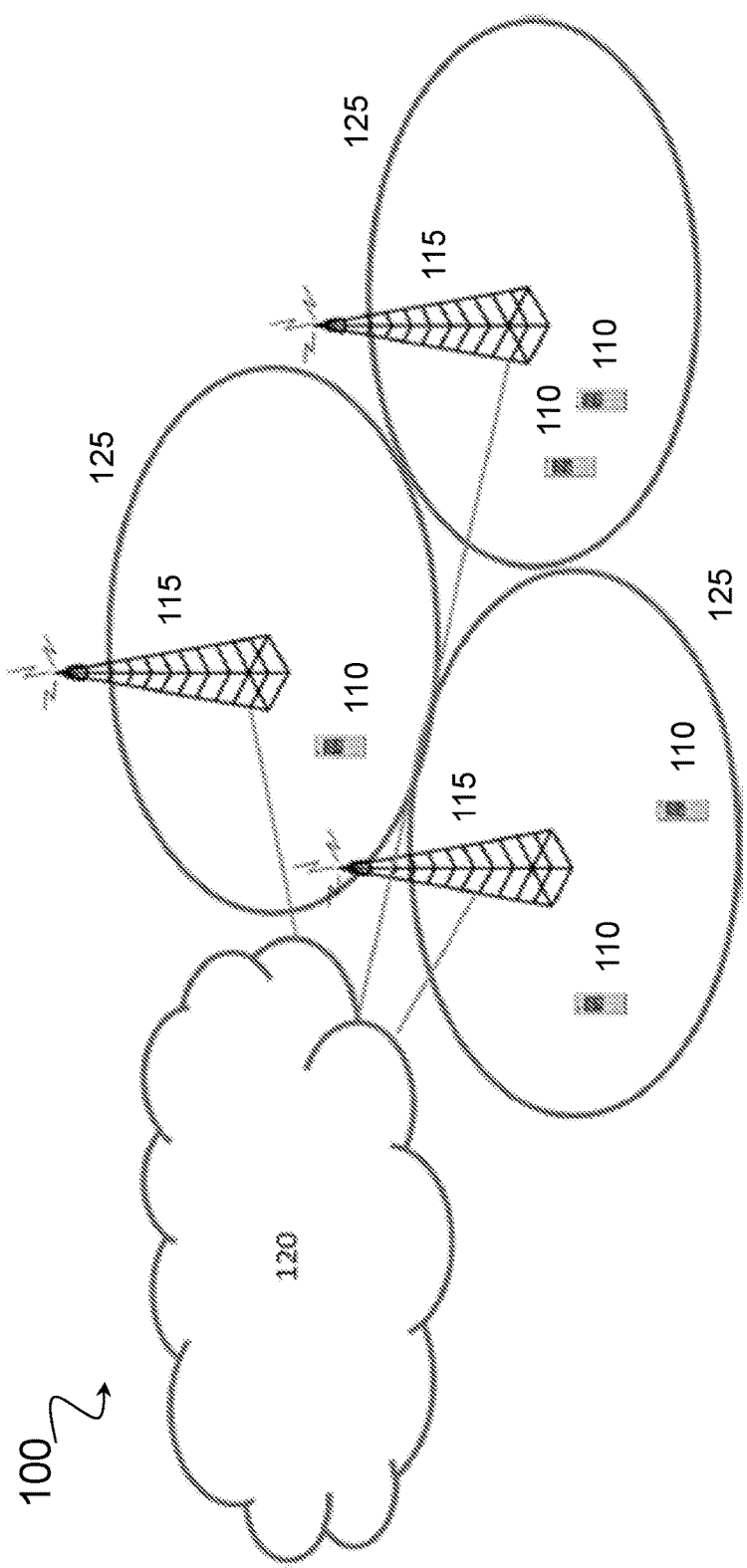
FIG. 1 is a diagram illustrating an example LTE network.

As described above, there are many benefits associated with multi-carrier D2D communication. Enabling multi-carrier D2D communications, however, poses several non-trivial challenges, especially in terms of UE capability and requirements. To realize D2D communications on multiple carriers, two possible alternatives can be envisaged. One alternative is to increase UE capability requirements. One way to improve D2D performance is to increase the minimum band-combination requirement for UEs that are capable of performing multi-carrier D2D. For example, a UE may be required to have multiple transmitter and receiver chains in order to be able to be configured to perform discovery transmission on a carrier that is not used for cellular (or simply a carrier (inter-PLMN or intra-PLMN) in which a certain service is provided). Such a solution would benefit both intra-PLMN and inter-PLMN discovery. Increasing UE capabilities in terms of additional transmitter and/or receiver chains, however, may affect the implementation complexity and the device cost. The impact on energy consumption may also be significant. As such, limiting multi-carrier D2D communications to UEs with multiple transmitter/receiver chains may not be an attractive solution, especially for commercial applications.

Another alternative is to define configurable gaps that allow a UE to share a common receiver or transmitter chain between D2D and cellular during a D2D pool indicated by the serving eNB. Similar to measurement gaps in ordinary cellular communications, the rationale of D2D gaps is that a UE connected to a certain carrier in a certain frequency switches its radio frequency (RF) transmitter/receiver chain to another carrier in another frequency selected for D2D communication/discovery. The RF switch takes place just before the selected D2D resource pool starts. An approach based on D2D gaps allows sharing in time a single transmitter and/or receiver chain (or related capabilities) across carriers, at the cost of some performance degradation. Such performance degradation might be exacerbated when D2D communications take place in inter-PLMN or out-of-network coverage scenarios. In such a case, the eNB to which the UE is typically connected is unaware of the resource allocation the UE has selected. Additionally, when performing D2D gaps, the UE adopts a transmission gap spanning at least the whole resource pool. However, the actual transmission typically occurs on only a fraction of the resources spanned by the gap. Therefore, the degradation of cellular UL is unnecessarily large.

The present disclosure contemplates various embodiments that may address these and other challenges and shortcomings associated with existing approaches. For example, the various embodiments described herein provide methods and apparatuses that can be used in conjunction with multi-carrier D2D communication, and may advantageously reduce the length of interruptions of UL transmissions for supporting D2D autonomous resource allocation by a wireless device. As described in more detail below, in some cases this may be achieved by enabling signaling from a wireless device (such as, for example, a UE) to a central scheduler (such as, for example, an eNB) to provide an indication of time resources used for transmission within a D2D resource pool. In some cases, this information may be provided before a pool start. The various embodiments described herein may allow the eNB to allocate UL transmission to the wireless device while avoiding resources where the device is expected to perform D2D transmission.

For example, in certain embodiments a method in a wireless device is disclosed. The wireless device determines one or more time resources in a particular carrier from one or more pools of time resources for a sidelink operation by the wireless device. In some cases, the sidelink operation may be receiving a sidelink transmission and/or transmitting a sidelink transmission. The wireless device sends a gap request message to a network node, the gap request message indicating one or more gaps requested by the wireless device. The one or more gaps may comprise the determined one or more time resources for the sidelink operation. The gap request message may be sent within a predefined time period preceding a repetition of at least one of the one or more pools of time resources. In some cases, the wireless device may receive a positive acknowledgement from the network node. The positive acknowledgement may indicate that the wireless device may proceed with the sidelink operation. In some cases, the wireless device may receive a negative acknowledgement from the network node. The negative acknowledgement may indicate that the wireless device shall prioritize one or more uplink transmissions to the network node over the sidelink operation. In some cases, the wireless device may receive a resource allocation configuration from the network node, the resource allocation configuration based at least in part on the one or more gaps requested by the wireless device in the gap request message.

As another example, in certain embodiments a method in a wireless device is disclosed. The wireless device determines one or more time resources in a particular carrier from one or more pools of time resources for a sidelink transmission by the wireless device. The wireless device determines whether an uplink grant for scheduling an uplink transmission is received from a network node during a predefined period, the predefined period comprising a period of time preceding the sidelink transmission. For example, the predefined period may be a period of time during which reception of an uplink grant would lead to an uplink transmission that would collide with the sidelink transmission. If the wireless device determines that the uplink grant was received during the predefined period, the wireless device aborts the sidelink transmission. In such a case, the wireless device may, for example, postpone the sidelink transmission to a later occasion or select one or more different time resources from the one or more pools of time resources that would not collide with the uplink transmission scheduled by the network node. If the wireless device determines that the uplink grant was not received during the predefined period, the wireless device transmits the sidelink transmission. For example, the wireless device may perform the uplink transmission scheduled by the uplink grant received from the network node.

As another example, in certain embodiments a method in a network node is disclosed. The network node receives a gap request message from a wireless device indicating one or more gaps requested by the wireless device, the one or more gaps comprising one or more time resources in a particular carrier selected from one or more pools of time resources for a sidelink operation by the wireless device. The gap request message may be received within a predefined time window preceding a repetition of at least one of the one or more pools of time resources. The network node determines an allocation of resources for the wireless device based at least in part on the one or more gaps indicated in the received gap request message. In some cases, the network node may send, in response to the gap request message from the wireless device, a positive acknowledgement indicating that the wireless device may proceed with the sidelink operation. In some cases, the network node may send, in response to the gap request message from the wireless device, a negative acknowledgement indicating that the wireless device shall prioritize one or more uplink transmissions to the network node over the sidelink operation.

The various example embodiments described above may advantageously reduce the length of interruptions of UL transmissions in conjunction with multi-carrier D2D communication. In some cases, the various embodiments may achieve this by enabling a UE to switch the transmitter chain during and/or around actual D2D transmission subframes (i.e., D2D transmission gaps) within a D2D resource pool. Furthermore, certain embodiments may allow a wireless device to efficiently time-share its transmitter chains between D2D and cellular uplink transmission.

Figure 2:
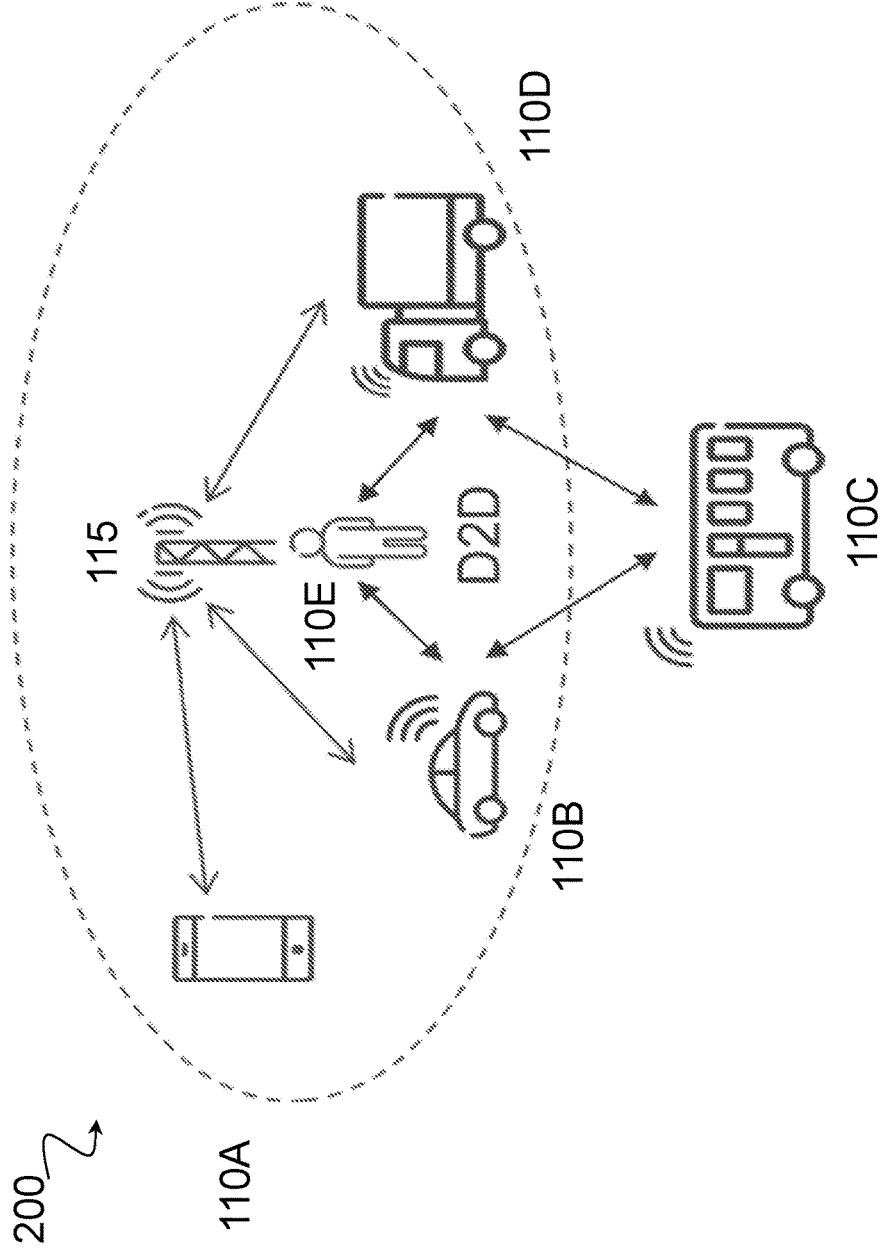
FIG. 2 illustrates an example embodiment of a wireless communications network, in accordance with certain embodiments.

FIG. 2 illustrates an example embodiment of a wireless communications network 200, in accordance with certain embodiments. More particularly, FIG. 2 is a block diagram illustrating an embodiment of a network 200 that includes one or more wireless devices 110 (which may be interchangeably referred to as UEs 110) and network node(s) 115 (which may be interchangeably referred to as eNBs 115). More particularly, UE 110A is a smart phone, UEs 110B-D are vehicles, and UE 110E is a pedestrian having a wireless device 110, such as, for example, a smart phone. UEs 110 may be D2D capable UEs (and may be interchangeably referred to as D2D UEs 110). UEs 110 may communicate with network node 115, or with one or more other UEs 110 over a wireless interface. For example, UEs 110A, 110B, and 110D may transmit wireless signals to network node 115 and/or receive wireless signals from network node 115. UEs 110 may also transmit wireless signals to other UEs 110 and/or receive wireless signals from other UEs 110. For example, UEs 110B, 110C, 110D, and 110E may communicate using D2D communication. The wireless signals may contain voice traffic, data traffic, control signals, and/or any other suitable information. In some embodiments, an area of wireless signal coverage associated with network node 115 may be referred to as a cell.

In certain embodiments, network node 115 may interface with a radio network controller. The radio network controller may control network node 115 and may provide certain radio resource management functions, mobility management functions, and/or other suitable functions. In certain embodiments, the functionality of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding Network node 115 may interface with other network nodes using any suitable interface. For example, network node 115 may interface with another network node 115 using an X2 interface.

In some embodiments, the core network node may manage the establishment of communication sessions and various other functionalities for UEs 110. UE 110 may exchange certain signals with the core network node using the non-access stratum layer. In non-access stratum signaling, signals between wireless device 110 and the core network node may be transparently passed through the radio access network. Example embodiments of wireless device 110, network node 115, and other network nodes (such as radio network controller or core network node) are described in more detail below with respect to FIGS. 8-12 below.

In some embodiments, the general term "network node" is used and it can correspond to any type of radio network node or any network node that communicates with a UE and/or with another network node. Examples of network nodes are NodeB, MeNB, SeNB, a network node belonging to MCG or SCG, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node (e.g. MSC, MME, etc.), O&M, OSS, SON, positioning node (e.g., E-SMLC), MDT or any other suitable network node.

In some embodiments, the non-limiting term UE is used and it refers to any type of wireless device communicating with a network node and/or with another UE in a cellular or mobile communication system. Examples of UE include target device, D2D UE, machine-type-communication (MTC) UE or UE capable of machine-to-machine communication (M2M), low-cost and/or low-complexity UE, a sensor equipped with UE, Tablet, mobile terminals, smart phone, laptop embedded equipment (LEE), laptop mounted equipment (LME), USB dongles, Customer Premises Equipment (CPE), etc. UE 110 may operate under either normal coverage or enhanced coverage with respect to its serving cell. The enhanced coverage may be interchangeably referred to as extended coverage. UE 110 may also operate in a plurality of coverage levels (e.g., normal coverage, enhanced coverage level 1, enhanced coverage level 2, enhanced coverage level 3 and so on). In certain embodiments, UE 110 may be capable of operating in out-of-network coverage scenarios.

The terminology such as network node and UE should be considered non-limiting and does in particular not imply a certain hierarchical relation between the two; in general "eNodeB" could be considered as device 1 and "UE" device 2, and these two devices communicate with each other over some radio channel.

Although FIG. 2 illustrates a particular arrangement of network 200, the present disclosure contemplates that the various embodiments described herein may be applied to a variety of networks having any suitable configuration. For example, network 200 may include any suitable number of UEs 110 and network nodes 115, as well as any additional elements suitable to support communication between UEs or between a UE and another communication device (such as a landline telephone). Furthermore, although certain embodiments may be described as implemented in a Long Term Evolution (LTE) network, the embodiments may be implemented in any appropriate type of telecommunication system supporting any suitable communication standards (including 5G standards) and using any suitable components, and are applicable to any radio access technology (RAT) or multi-RAT systems in which the UE receives and/or transmits signals (e.g., data). For example, the various embodiments described herein may be applicable to LTE, LTE-Advanced, UMTS, HSPA, GSM, cdma2000, WiMax, WiFi, another suitable radio access technology, or any suitable combination of one or more radio access technologies.

Although certain embodiments may be described in the context of wireless transmissions in the UL, the present disclosure contemplates that the various embodiments are equally applicable in the DL. Moreover, the various embodiments described herein are applicable for cellular and D2D operations on single carrier or on multi-carrier (also known as carrier aggregation (CA)). The embodiments are also applicable for cellular and/or D2D operations in dual connectivity (DC).

Furthermore, although certain example embodiments may be described in terms of sidelink and cellular communication links, the various embodiments are not limited to such an example. The present disclosure contemplates that the various embodiments may be applicable to any suitable communication links, and that the various embodiments may be applicable to any scenario in which one communication link is subject to interruption by operation of a second communication link.

In the description that follows, the term D2D corresponds to any direct transmission occurring between two or more devices, for the purpose of, for example, direct control signaling, direct data communication or peer device presence discovery. Although certain embodiments are presented in the context of D2D transmission, the described concepts can be applied to other types of transmission (e.g., cellular transmission or when the UE aggregates licensed carriers with unlicensed spectrum such as WiFi).

Being described in the general context of direct transmission between devices, certain embodiments are suitable for communication between vehicles and other devices, also known as vehicle-to-anything (V2x), within which vehicle-to-vehicle (V2V) is an important example. For example, UE 110B may communicate with UE 110C using V2C communication as shown in FIG. 2. One V2V scenario consists of cellular operation on some carriers and V2V operation on some other carrier. The device may be assumed to be provided with sufficient capabilities to receive data simultaneously on the cellular carrier(s) and on the V2V carrier(s), however the device is not able to simultaneously transmit on such carriers. The various embodiments described herein are also applicable to intelligent transportation systems (ITS).

In certain embodiments described herein, UL transmission is prioritized over D2D transmission, which is specified in 3GPP Rel-12. As such, a D2D gap can be seen as an exception to UL prioritization where D2D transmission is prioritized over UL transmission on a given carrier within the duration of the gap. In some cases, it may be assumed that network node 115 (e.g., an eNB) is aware of the pools of D2D resources to be used by wireless devices 110 for transmission and/or reception of D2D signals on a given carrier. In some cases, it may also be assumed that the same network node 115 performs cellular communication in UL and/or DL on at least another carrier for at least some wireless device 110 that is also participating in D2D. It may also be assumed that wireless device 110 selects autonomously resources within one or more D2D pools for D2D transmission.

In a first example embodiment, a method in a wireless device, such as wireless device 110B, is disclosed. Although the various example embodiments may be described with respect to FIG. 2 using wireless device 110B as an example, the present disclosure contemplates that the various embodiments are applicable to any suitable wireless device 110B (for example wireless devices 110A-E).

Wireless device 110B determines one or more time resources in a particular carrier from one or more pools of time resources for a sidelink operation by wireless device 110B. The sidelink operation may be any suitable operation. For example, in some cases the sidelink operation may be receiving a sidelink transmission. As another example, the sidelink operation may be transmitting a sidelink transmission.

In certain embodiments, wireless device 110 may signal its capability to indicate D2D transmissions as part of its capabilities indication to network node 115. For example, wireless device 110 may send capability information to network node 115, the capability information indicating that wireless device 110 is capable of indicating one or more time resources in the particular carrier from the one or more pools of time resources for the sidelink operation by wireless device 110. In certain embodiments, network node 115 may correspondingly configure such signaling.

Wireless device 110B sends a gap request message to network node 115, the gap request message indicating one or more gaps requested by wireless device 110B. The one or more gaps may comprise the determined one or more time resources for the sidelink operation.

The gap request message may contain any suitable information. As described above, the gap request message includes the one or more D2D transmission resources in a particular carrier that wireless device 110B intends to use (e.g., the subframes intended for sidelink data transmission). As another example, the gap request message may also include a synchronization offset between a cellular carrier to which wireless device 110B is connected and the carrier used for D2D transmission. As another example, the gap request message may include the time necessary to acquire synchronization and system information from the sidelink cell, as well as the time needed to retune the transmit (TX)/receive (RX) chain (e.g., if the sidelink cell is different from the serving cell). In certain embodiments, the gap request message may include one or more of: a purpose or application of the sidelink operation; a priority related parameter (such as a priority related parameter for such D2D transmission, for example the priority of the traffic that is meant to be sent over certain resources); a signal type for the sidelink operation; a type of traffic for the sidelink operation; a carrier to which the gap applies (for example, the frequency (or an index of the frequency) to which the gap applies); and any other suitable information. For example, if different types of D2D signals are possible, the D2D signal type may be indicated (e.g., synchronization signals, control information, data, etc.).

Wireless device 110B may signal to network node 115 at least the time resources within the pool to be used for D2D transmission in any suitable manner. For example, the resource indication (e.g., gap request message) may, for example, consist of an RRC information element or a medium access control (MAC) header in an UL protocol.

In some cases, wireless device 110B may indicate its intention to transmit any D2D signal at all within a certain D2D pool. For example, in certain embodiments the one or more pools of D2D resources may be periodic. If the pool is periodic, wireless device 110B may signal the resources to be used in a sequence of pools in the future. Such an indication may be explicit or implicit. As one example, the gap request message may include an index indicating the one or more resources from the one or more resource pools to be used by wireless device 110B in one or more subsequent sidelink periods (which may be more convenient if some resource hopping patterns are predefined and can be signaled by use of the index).

One potential issue that may occur is that a wireless device 110 may stop using the D2D resources for some reason. In this case, wireless device 110 may indicate such condition to network node 115. For example, wireless device 110 may send an indication to network node 115 that wireless device 110 is no longer using the requested one or more gaps. Alternatively, if the resources are indicated to network node 115 in a semi-persistent fashion, a maximum time validity for the allocation may be indicated or specified and the allocation needs to be confirmed (possibly with compact signaling) by wireless device 110 after or close to when the validity is expiring.

Wireless device 110 may send the gap request message to network node 115 at any suitable time. For example, in certain embodiments the gap request message may be sent within a predefined time window preceding each pool repetition in order to be considered by network node 115 for such pool repetition. This is because network node 115 needs a certain amount of time to schedule UL transmissions accordingly. For example, at least 4 subframes need to pass between the signaling and the start of the pool. As another example, the signaling may occur within a certain time window preceding the resource pool, for example starting from the previous repetition of the last signaling occasion for a given pool repetition. One possible signaling mechanism for the first example embodiment is depicted in FIG. 3.

Figure 3:
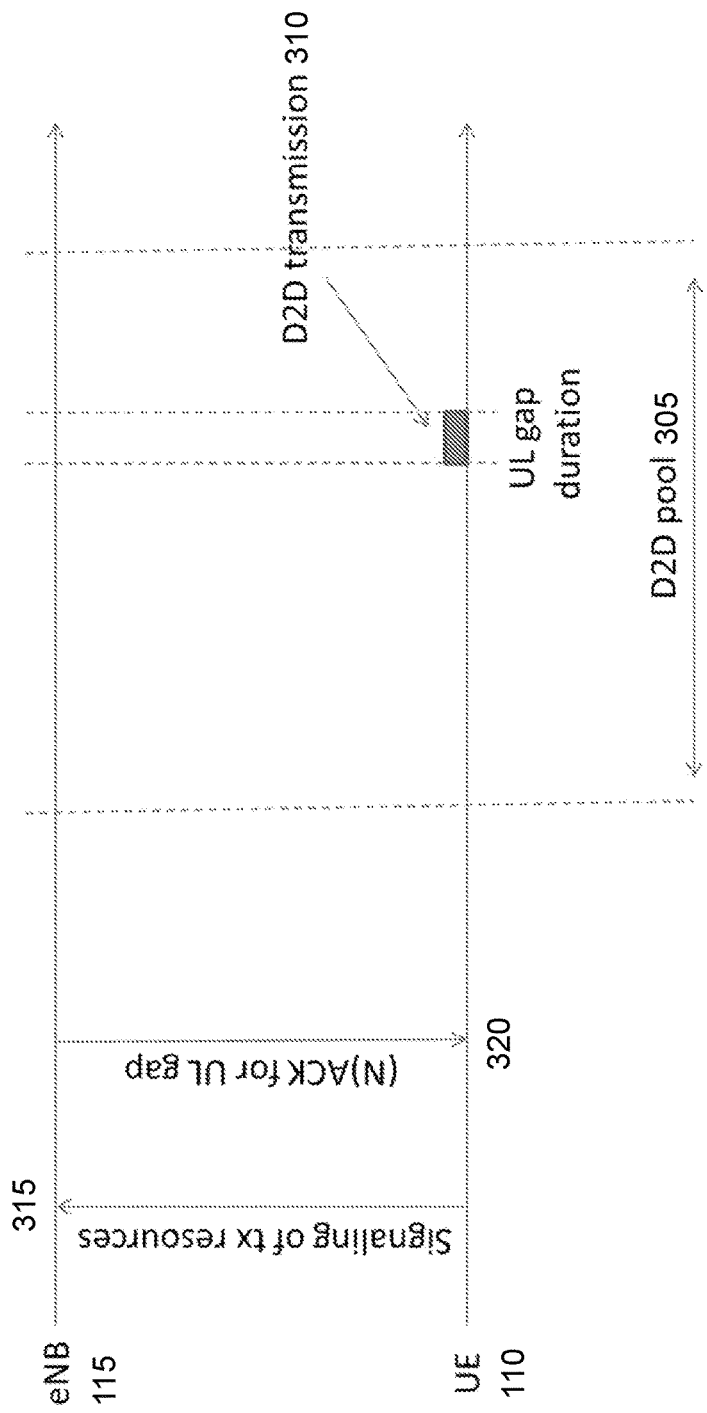
FIG. 3 illustrates an example signaling mechanism, in accordance with certain embodiments.

FIG. 3 illustrates an example signaling mechanism, in accordance with certain embodiments. FIG. 3 illustrates a D2D transmission pool 305 and resources 310 that wireless device 110 has selected for D2D transmission. Wireless devices 110 typically transmit discovery signals on a small fraction of the subframes belonging to D2D pool 305 (typically only 1 or few subframes).

In some cases, network node 115 knows the specific resources that wireless device 110 uses for D2D transmission (e.g., Type-2 Discovery or Mode-1 Communication in Rel-12). In those cases, network node 115 is aware of D2D subframes and hence the D2D gap.

In other cases, network node 115 does not know the specific resources for D2D transmission by wireless device 110 (e.g., for Type-1 Discovery and Mode-2 Communication). Therefore, some signaling is required where wireless device 110 informs network node 115 about the selected D2D subframes 310. At step 315, wireless device 110 sends a gap request message to network node 115, the gap request message indicating one or more gaps requested by the wireless device, the one or more gaps comprising the determined time resources 310 for sidelink operation.

Typically, network node 115 must have the possibility to acknowledge the gap, in which case wireless device 110 is exempt from transmitting UL on those subframes on a given carrier, or to unacknowledged the gap, in which case wireless device 110 must prioritize UL against D2D. For example, in certain embodiments if network node 115 acknowledges the gap, at step 320 wireless device 110 receives a positive acknowledgment from network node 115, the positive acknowledgement indicating that wireless device 110 may proceed with the sidelink operation. Alternatively, in certain embodiments if network node 115 does not acknowledge the gap, at step 320 wireless device 110 receives a negative acknowledgement from network node 115, the negative acknowledgement indicating that the wireless device shall prioritize one or more uplink transmissions to network node 115 over the sidelink operation. In some cases, the negative acknowledgement may be explicit (as described above), but in other cases the negative acknowledgement may be implicit. For example, if wireless device 110 does not receive a positive acknowledgement, wireless device 110 may consider the lack of receipt of the positive acknowledgement as an implicit negative acknowledgement and prioritize one or more uplink transmissions to network node 115 over the sidelink operation.

As described above, the signal wireless device 110 sends to network node 115 may contain any suitable information. For example, the gap request message may also contain information regarding the type of traffic wireless device 110 would like to transmit over the D2D interface, the priority, as well as physical layer information like the synchronization offset between the serving cellular carrier and the inter-PLMN/out-of-coverage carrier, and/or the length in subframes of the D2D gap. As another example, the gap request message may also indicate the carrier in which the gap should apply (regardless of whether the carrier is inter-PLMN or intra-PLMN). Upon reception of signaling from wireless device 110, network node 115 determines whether to allow the D2D gap or not as described in detail below in relation to a third example embodiment.

In case of semi-static resource allocation, wireless device 110 may not need to always inform network node 115 about the D2D gap configuration. For example, in certain embodiments wireless device 110 can just inform network node 115 when the D2D gap configuration changes. A UE implementation may optimize its UL signaling by combining the resource indication with other UL transmissions. The resource indication (e.g., gap request message) may, for example, consist of an RRC information element or a medium access control (MAC) header in an UL protocol.

In certain embodiments, the example signaling methods described above may potentially be limited to devices that are RRC connected and thus actively communicating with network node 115.

Returning to FIG. 2, according to a second example embodiment a method in wireless device, such as wireless device 110B, is disclosed. According to the second example embodiment, wireless device 110B may perform a D2D transmission opportunistically without informing network node 115. For example, wireless device 110B may determine one or more time resources in a particular carrier from one or more pools of time resources for a sidelink transmission by wireless device 110B. Wireless device 110B may determine whether an uplink grant for scheduling an uplink transmission is received from network node 115 during a predefined period. In some cases, the predefined period may be a period of time preceding the sidelink transmission. In certain embodiments, the predefined period may be a period of time during which reception of an uplink grant would lead to an uplink transmission that would collide with the sidelink transmission. Based on the determination of whether an uplink grant for scheduling an uplink transmission is received from network node 115 during the predefined period, wireless device 110B may perform one or more operations.

For example, upon determining that the uplink grant was received during the predefined period, wireless device 110B may abort the sidelink transmission. In certain embodiments, wireless device 110B may abort the sidelink transmission by postponing the sidelink transmission to a later occasion. In certain embodiments, wireless device 110 may abort the sidelink transmission by selecting one or more different time resources from the one or more pools of time resources that would not collide with the uplink transmission scheduled by network node 115. In some cases, wireless device 110B may be authorized to perform the sidelink operation despite receiving the uplink grant during the predefined period. For example, if the uplink grant schedules an uplink transmission that would collide with a sidelink transmission during the gap, wireless device 110B may prioritize the sidelink operation over the uplink transmission scheduled by the uplink grant.

As another example, upon determining that the uplink grant was not received during the predefined period, wireless device 110B may transmit the sidelink transmission. In certain embodiments, wireless device 110B may perform the uplink transmission scheduled by the uplink grant received from network node 115. One possible signaling mechanism for the second example embodiment is depicted in FIG. 4.

Figure 4:
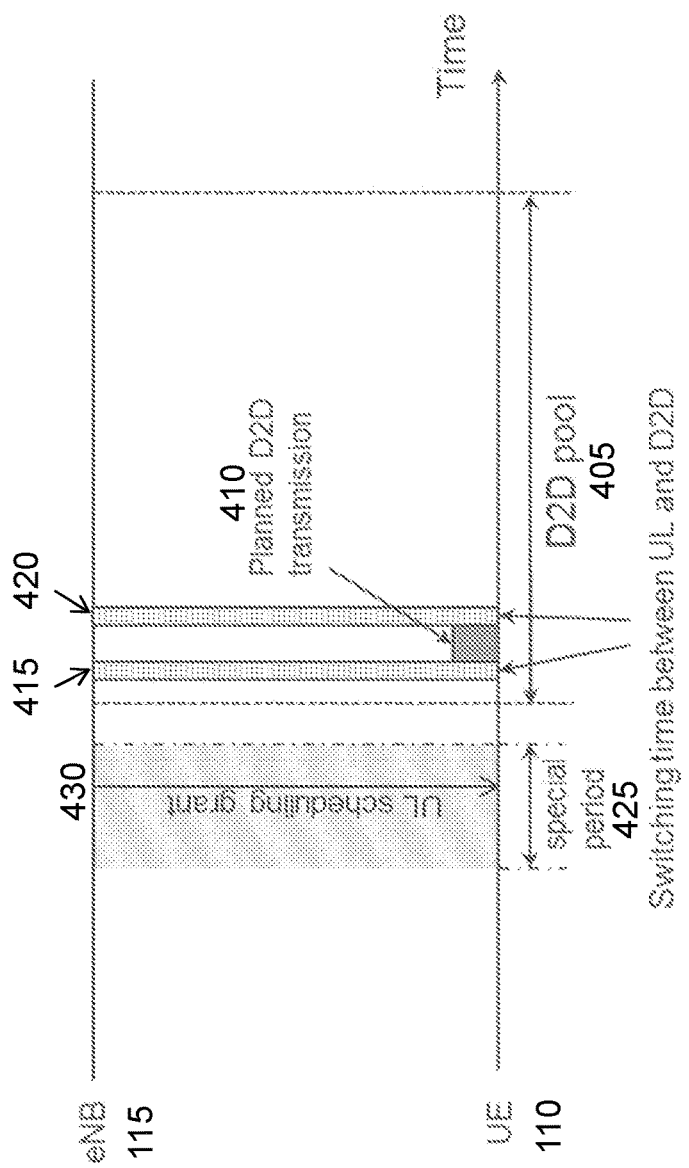
FIG. 4 illustrates another example signaling mechanism, in accordance with certain embodiments.

FIG. 4 illustrates another example signaling mechanism, in accordance with certain embodiments. FIG. 4 illustrates a D2D transmission pool 405 and resources 410 that wireless device 110 has selected for D2D transmission in a certain subframe within the D2D pool. Wireless devices 110 typically transmit discovery signals on a small fraction of the subframes belonging to D2D pool 405 (typically only 1 or few subframes). FIG. 4 also illustrates time duration 415 (before such D2D transmission) and time duration 420 (after such D2D transmission). During time durations 415 and 420, wireless device 110 switches its transmitter chain between UL and D2D transmissions. Wireless device 110 listens to the DL resources prior to the planned D2D transmission. FIG. 4 also illustrates a predefined period of time 425 (which may be interchangeably referred to herein as a "special period"). Special period 425 precedes planned D2D transmission 410. Note that "planned" may mean that wireless device 110 has autonomously assigned the resource for D2D transmission according to some resource allocation strategy.

The time relationship between UL grant reception on the DL carrier and UL transmission is determined by standardized rules in LTE. In this context, "special period" 425 denotes a time period during which reception of an UL grant would lead to an UL transmission colliding with the planned D2D transmission or to the associated carrier switching time (or similar associated interruptions). In other words, UL transmissions scheduled during special period 425 are incompatible with planned D2D transmission 410.

According to the example of FIG. 4, wireless device 110 determines at step 430 whether an uplink grant for scheduling an uplink transmission is received from network node 115 during special period 425. If wireless device 110 does not receive an UL scheduling grant from network node 115 during special period 425, wireless device 110 will perform the D2D transmission as planned. In this case, network node 115 may be unaware of the D2D transmission. On the other hand, if wireless device 110 receives an UL scheduling grant during special period 425, wireless device 110 will abort the planned D2D transmission. As one example, wireless device 110 may postpone the D2D transmission to a later occasion and repeat the procedure described herein, either in the same D2D pool or in a later D2D pool. As another example, if an UL grant is received during special period 425, wireless device 110 may perform UL transmissions (e.g., on Physical Uplink Shared Channel (PUSCH) as granted by the UL grant, and possibly even on Physical Uplink Control Channel (PUCCH), Sounding Reference Signal (SRS) or any other UL channel/signal).

In certain embodiments, the prioritization of UL after reception of an UL grant within special period 425 may have higher priority than a gap previously acknowledged by network node 115. In other words, a gap can be overridden by a later UL grant received within special period 425.

As described above, wireless device 110 does not perform the D2D gap in case network node 115 schedules an UL transmission during the D2D gap. However, wireless device 110 may autonomously select another resource within the same D2D pool 405 for D2D transmissions not colliding with any scheduled UL transmission as shown in FIG. 4.

Returning to FIG. 2, according to a third example embodiment a method in a network node is disclosed. In certain embodiments, network node 115 receives a gap request message from a wireless device, such as wireless device 110B, indicating one or more gaps requested by wireless device 110B. The one or more gaps may comprise one or more time resources in a particular carrier selected from one or more pools of time resources for a sidelink operation by wireless device 110B. Network node 115 determines an allocation of resources for wireless device 110B based at least in part on the one or more gaps indicated in the received gap request message. In certain embodiments, network node 115 allocates resources for wireless device 110B according to the determined allocation of resources.

Network node 115 may determine an allocation of resources for wireless device 110B in any suitable manner. In certain embodiments, network node 115 may allocate UL resources to wireless device 110B taking into account the resources signaled by wireless device 110B for D2D transmission as described above in relation to the first example embodiment. As one example, network node 115 may send a resource allocation configuration to wireless device 110B. The resource allocation configuration may be based at least in part on the one or more gaps requested by wireless device 110B in the gap request message. As another example, if wireless device 110B indicates D2D transmission in a given time resource belonging to a D2D pool, network node 115 avoids scheduling UL on at least one of the configured and active UL carriers for wireless device 110B, at least on the resources overlapping in time with the D2D transmission. In some cases, network node 115 avoids scheduling UL on additional resources preceding and following the D2D transmission to allow wireless device 110B to switch its transmitter chain between carriers. As another example, network node 115 can avoid transmitting and scheduling DL and UL on any carrier in certain subframes (interruptions) preceding and following a D2D transmission (or transmission pool) to allow wireless device 110B to retune its radio front ends.

Alternatively, if wireless device 110B is scheduled for UL transmission during a D2D gap (including the case of automatic retransmissions), network node 115 may drop the UL transmission or alternatively postpone it to a later subframe. Corresponding operations in the transmission buffer management and redundancy version selections are performed in the transmitter. Similarly, in the case of pending HARQ uplink processes when performing D2D gaps, wireless device 110B may maintain the UL buffer and possibly resume the HARQ processes when the D2D gaps terminates.

In certain embodiments, if wireless device 110B is not configured to indicate its D2D transmission resources, network node 115 may consider at least the whole D2D pool as a D2D gap. Wireless device 110B may take into account the priority/service type or other similar parameters of the D2D transmission and possibly of the cellular data for prioritizing between UL and D2D.

As described above with respect to FIGS. 3 and 4, in certain embodiments network node 115 confirms the use of gaps to wireless device 110B prior to the gap occasion. If network node 115 does not confirm the gap, wireless device 110B is not allowed to skip the corresponding UL transmission. The gap confirmation may be implicit or explicit. For example, as described above with respect to FIG. 4, in certain embodiments wireless device 110B may interpret as implicit confirmation the lack of an UL grant (i.e., network node 115 does not schedule any new data for transmission during the D2D gaps subframes), and as implicit rejection the reception of a grant for transmission during the D2D gaps subframes. In case of explicit confirmation/rejection, some rules can be defined such that the gap (un)acknowledgment (as described above with respect to FIG. 3) must be transmitted to wireless device 110B at least a certain time interval before the potential gap or the associated pool. Such explicit confirmation/rejection might, for example, be delivered to wireless device 110B via a MAC control element in order to avoid RRC processing time.

As described above in relation to the first example embodiment, in case of semi-static resource allocation wireless device 110B may not need to always inform network node 115 about the need for a D2D gap in the next subframes. Therefore, network node 115 will still consider valid the D2D gap configuration until further notice from wireless device 110B. However, also in this case in which no D2D gap configuration is explicitly reported before the starting of the D2D pool, network node 115 may at any time stop wireless device 110B from performing D2D gap, for example on the basis of current D2D gap configuration and priority of D2D traffic.

Figure 5:
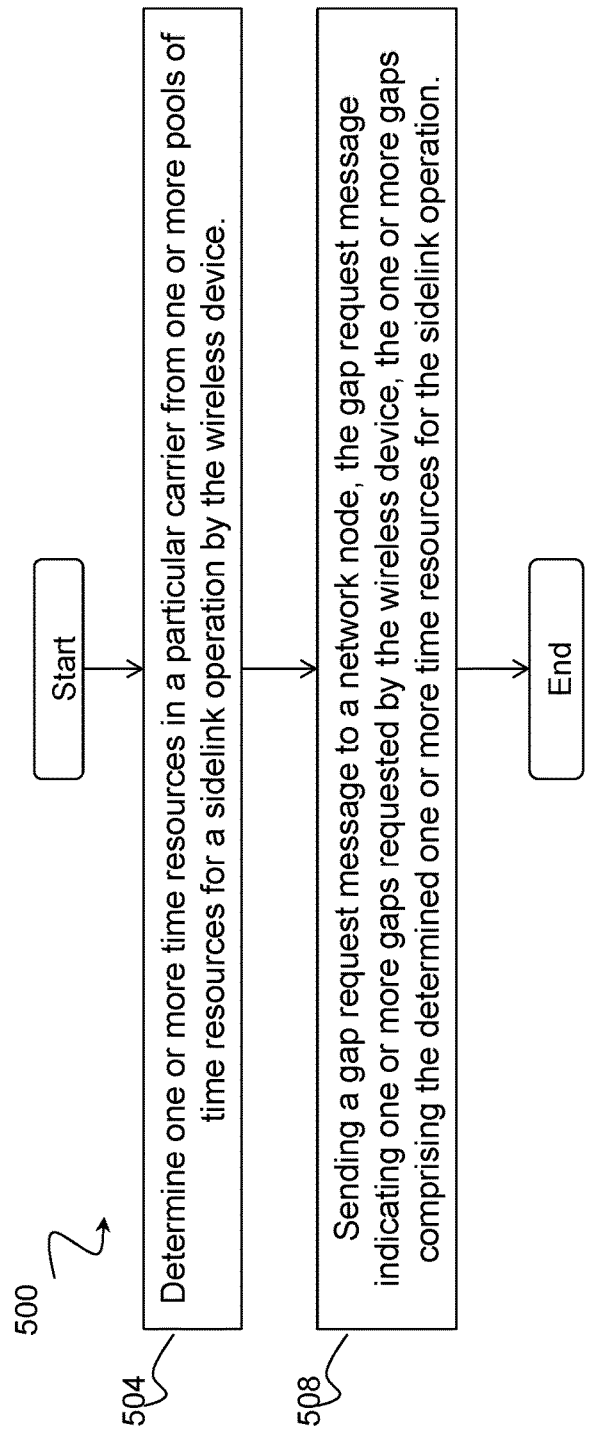
FIG. 5 is a flow diagram of a method in a wireless device, in accordance with certain embodiments.

FIG. 5 is a flow diagram of a method 500 in a wireless device, in accordance with certain embodiments. The method begins at step 504, where the wireless device determines one or more time resources in a particular carrier from one or more pools of time resources for a sidelink operation by the wireless device. In certain embodiments, the sidelink operation by the wireless device may comprise at least one of: receiving a sidelink transmission; and transmitting a sidelink transmission. In certain embodiments, the method may further comprise sending capability information to the network node, the capability information indicating that the wireless device is capable of indicating one or more time resources in the particular carrier from the one or more pools of time resources for the sidelink operation by the wireless device.

At step 508, the wireless device sends a gap request message to a network node, the gap request message indicating one or more gaps requested by the wireless device, the one or more gaps comprising the determined one or more time resources for the sidelink operation. In certain embodiments, the gap request message may be sent within a predefined time period preceding a repetition of at least one of the one or more pools of time resources. In certain embodiments, the one or more pools of time resources for the sidelink operation may be periodic, and the gap request message may further comprise an index indicating the one or more resources from the one or more resource pools to be used by the wireless device in one or more subsequent sidelink periods. In certain embodiments, the gap request message may further comprise one or more of: a purpose or application of the sidelink operation; a priority related parameter; a signal type for the sidelink operation; a type of traffic for the sidelink operation; and a carrier (for example, the frequency (or an index of the frequency)) to which the gap applies.

In certain embodiments, the method may further comprise receiving a positive acknowledgement from the network node, the positive acknowledgement indicating that the wireless device may proceed with the sidelink operation. In certain embodiments, the method may further comprise receiving a negative acknowledgement from the network node, the negative acknowledgement indicating that the wireless device shall prioritize one or more uplink transmissions to the network node over the sidelink operation. In certain embodiments, the method may further comprise sending an indication to the network node that the wireless device is no longer using the requested one or more gaps.

In certain embodiments, the method may further comprise receiving a resource allocation configuration from the network node, the resource allocation configuration based at least in part on the one or more gaps requested by the wireless device in the gap request message. The resource allocation configuration received from the network node may apply to the wireless device until otherwise indicated by the network node.

Figure 6:
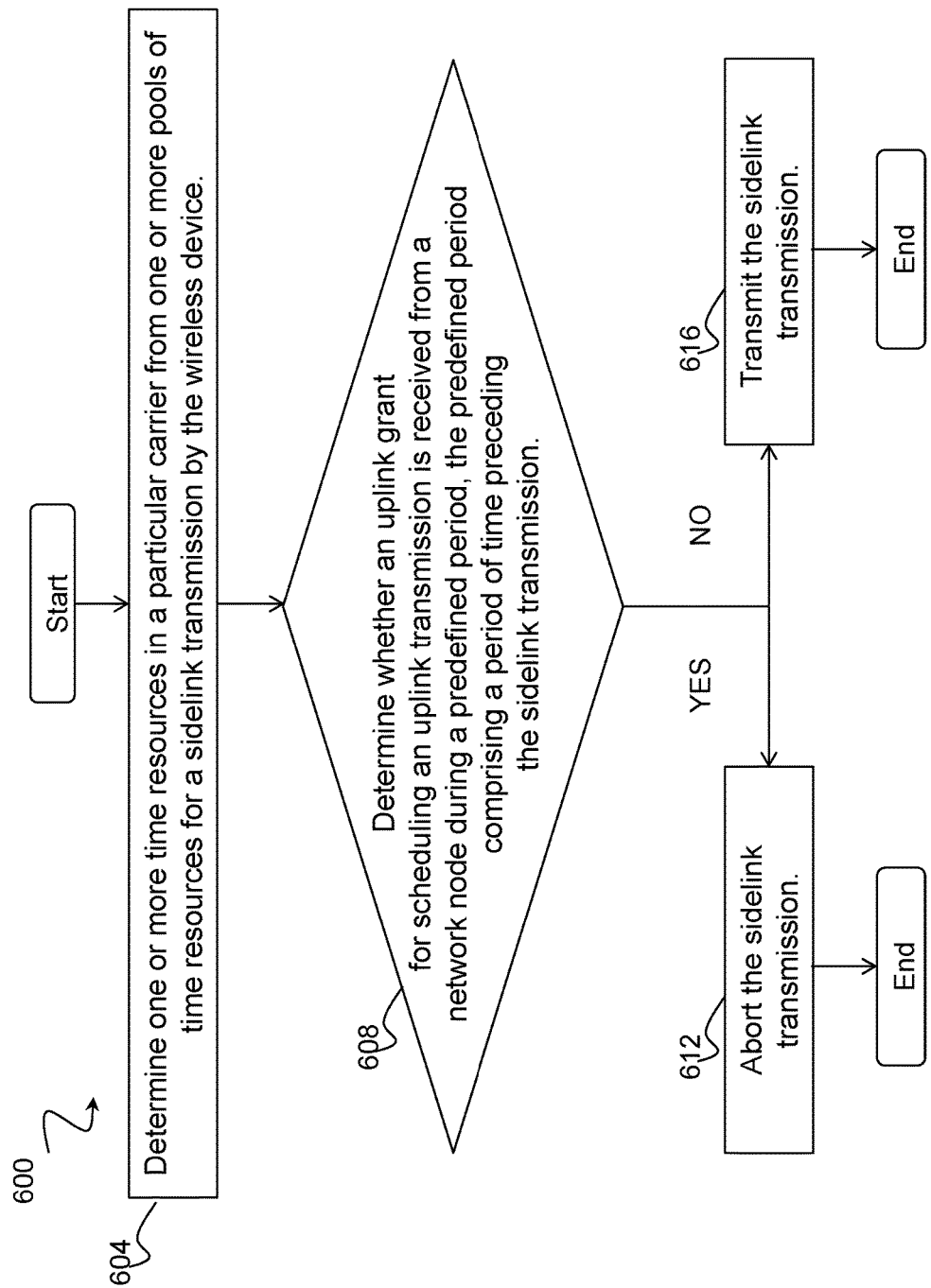
FIG. 6 is a flow diagram of a method in a wireless device, in accordance with certain embodiments.

FIG. 6 is a flow diagram of a method 600 in a wireless device, in accordance with certain embodiments. The method begins at step 600, where the wireless device determines one or more time resources in a particular carrier from one or more pools of time resources for a sidelink transmission by the wireless device.

At step 608, the wireless device determines whether an uplink grant for scheduling an uplink transmission is received from a network node during a predefined period, the predefined period comprising a period of time preceding the sidelink transmission. In certain embodiments, the predefined period may comprise a period of time during which reception of an uplink grant would lead to an uplink transmission that would collide with the sidelink transmission.

Upon determining that the uplink grant was received during the predefined period, the method proceeds to step 612. At step 612, the wireless device aborts the sidelink transmission. In certain embodiments, aborting the sidelink transmission may comprise at least one of: postponing the sidelink transmission to a later occasion; and selecting one or more different time resources from the one or more pools of time resources that would not collide with the uplink transmission scheduled by the network node. In certain embodiments, upon determining that the uplink grant was received during the predefined period, the method may further comprise performing the uplink transmission scheduled by the uplink grant received from the network node.

Upon determining that the uplink grant was not received during the predefined period, the method proceeds to step 616. At step 616, the wireless device transmits the sidelink transmission.

Figure 7:
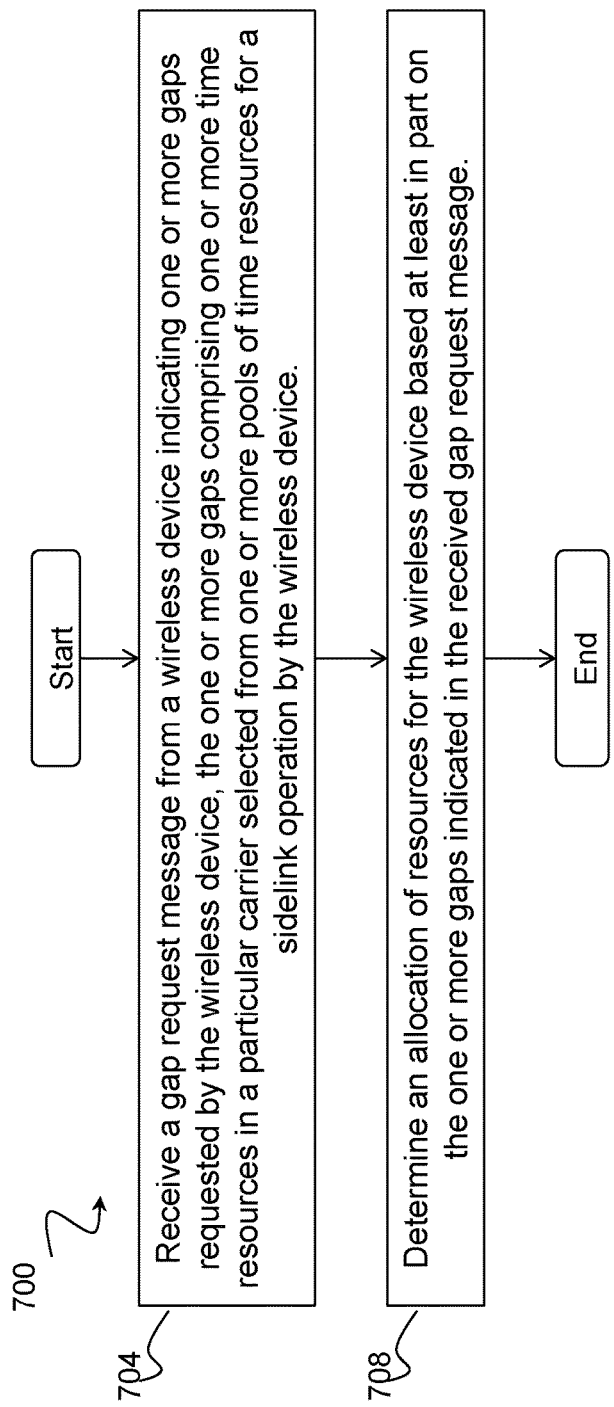
FIG. 7 is a flow diagram of a method in a network node, in accordance with certain embodiments.

FIG. 7 is a flow diagram of a method 700 in a network node, in accordance with certain embodiments. The method begins at step 704, where the network node receives a gap request message from a wireless device indicating one or more gaps requested by the wireless device, the one or more gaps comprising one or more time resources in a particular carrier selected from one or more pools of time resources for a sidelink operation by the wireless device. In certain embodiments, the gap request message may be received within a predefined time window preceding a repetition of at least one of the one or more pools of time resources. In certain embodiments, the gap request message may further comprise one or more of: a purpose or application of the sidelink operation; a priority related parameter; a signal type for the sidelink operation; a type of traffic for the sidelink operation; and a carrier to which the gap applies. In certain embodiments, the pool of time resources may be periodic, and the gap request message may further comprise an index indicating the one or more resources from the one or more resource pools to be used by the wireless device in one or more subsequent sidelink periods.

In certain embodiments, the method may further comprise receiving capability information from the wireless device, the capability information indicating that the wireless device is capable of indicating one or more time resources in the particular carrier from the one or more pools of time resources for the sidelink operation by the wireless device. In certain embodiments, the method may further comprise receiving an indication that the wireless device is no longer using the requested one or more gaps.

At step 708, the network node determines an allocation of resources for the wireless device based at least in part on the one or more gaps indicated in the received gap request message.

In certain embodiments, the method may further comprise sending, in response to the gap request message from the wireless device, a positive acknowledgement indicating that the wireless device may proceed with the sidelink operation. In certain embodiments, the method may further comprise sending, in response to the gap request message from the wireless device, a negative acknowledgement indicating that the wireless device shall prioritize one or more uplink transmissions to the network node over the sidelink operation.

In certain embodiments, the method may further comprise allocating resources for the wireless device according to the determined allocation of resources, wherein allocating resources for the wireless device comprises one or more of: sending a resource allocation configuration to the wireless device, the resource allocation configuration based at least in part on the one or more gaps requested by the wireless device in the gap request message; scheduling resources on at least one carrier for the wireless device that would not collide with the one or more time resources selected for the sidelink operation by the wireless device; and scheduling resources to avoid resources preceding and following the one or more time resources selected for the sidelink operation by the wireless device.

Figure 8:
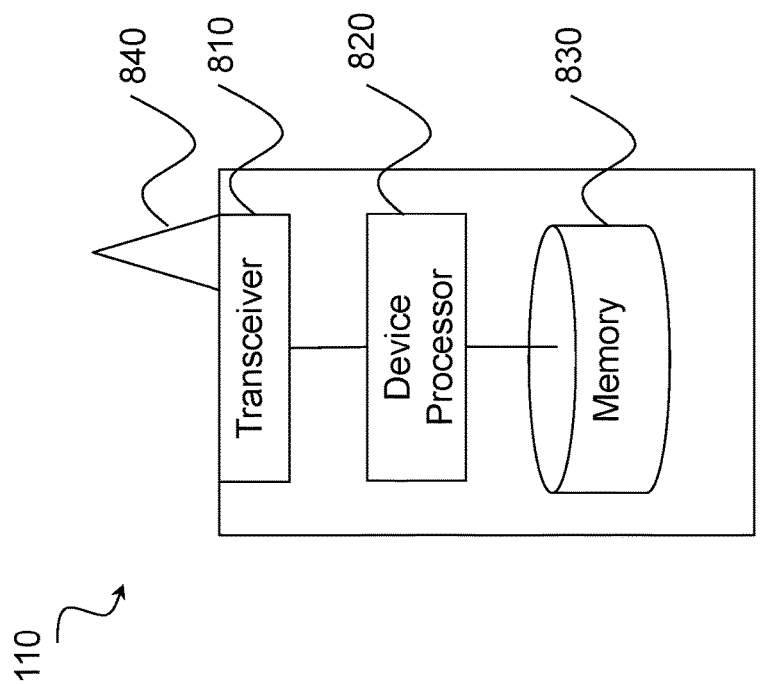
FIG. 8 is a block schematic of an exemplary wireless device, in accordance with certain embodiments.

FIG. 8 is a block schematic of an exemplary wireless device, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 810, processor 820, and memory 830. In some embodiments, transceiver 810 facilitates transmitting wireless signals to and receiving wireless signals from network node 115 (e.g., via antenna 840), processor 820 executes instructions to provide some or all of the functionality described above as being provided by wireless device 110, and memory 830 stores the instructions executed by processor 820.

Processor 820 may include any suitable combination of hardware and software implemented in one or more modules to execute instructions and manipulate data to perform some or all of the described functions of wireless device 110, such as the functions of wireless device 110 described above in relation to FIGS. 1-7. In some embodiments, processor 820 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processor 820.

Other embodiments of wireless device 110 may include additional components beyond those shown in FIG. 8 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processor 820. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 9:
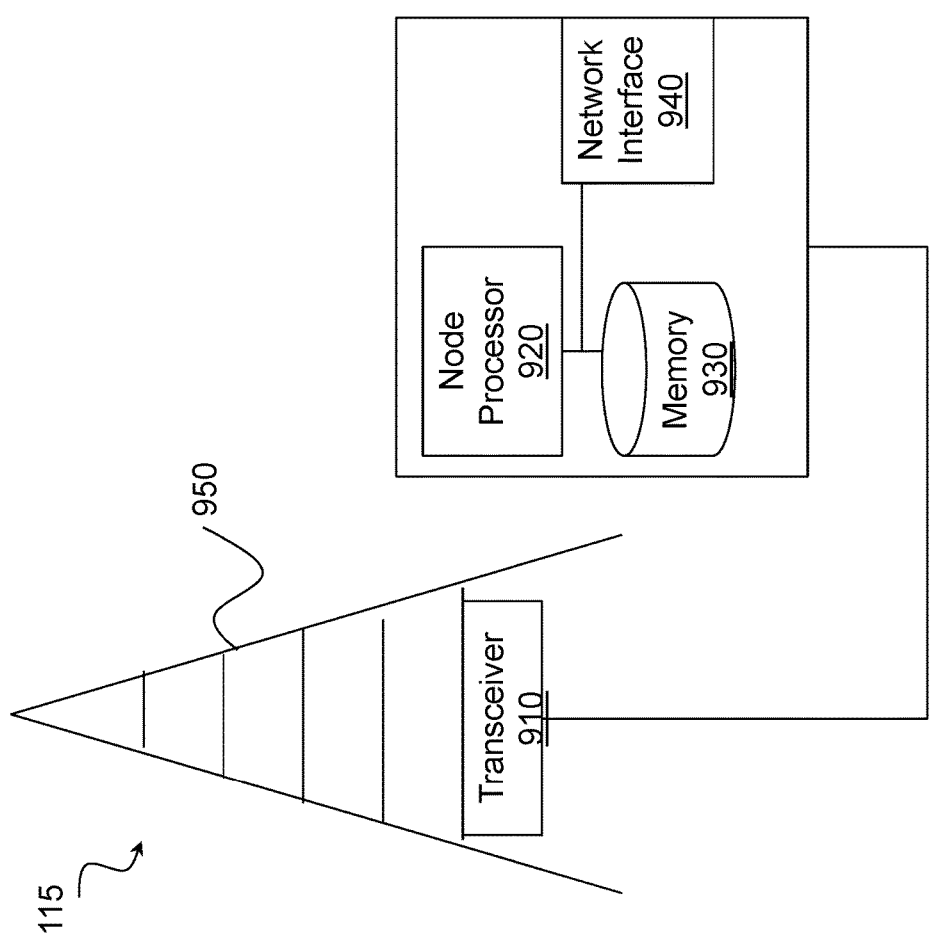
FIG. 9 is a block schematic of an exemplary network node, in accordance with certain embodiments.

FIG. 9 is a block schematic of an exemplary network node, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogenous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 910, processor 920, memory 930, and network interface 940. In some embodiments, transceiver 910 facilitates transmitting wireless signals to and receiving wireless signals from wireless device 110 (e.g., via antenna 950), processor 920 executes instructions to provide some or all of the functionality described above as being provided by a network node 115, memory 930 stores the instructions executed by processor 920, and network interface 940 communicates signals to backend network components, such as a gateway, switch, router, Internet, Public Switched Telephone Network (PSTN), core network nodes or radio network controllers 130, etc.

Processor 920 may include any suitable combination of hardware and software implemented in one or more modules to execute instructions and manipulate data to perform some or all of the described functions of network node 115, such as those described above in relation to FIGS. 1-7 above. In some embodiments, processor 920 may include, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information.

In some embodiments, network interface 940 is communicatively coupled to processor 920 and may refer to any suitable device operable to receive input for network node 115, send output from network node 115, perform suitable processing of the input or output or both, communicate to other devices, or any combination of the preceding. Network interface 940 may include appropriate hardware (e.g., port, modem, network interface card, etc.) and software, including protocol conversion and data processing capabilities, to communicate through a network.

Other embodiments of network node 115 may include additional components beyond those shown in FIG. 9 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 10:
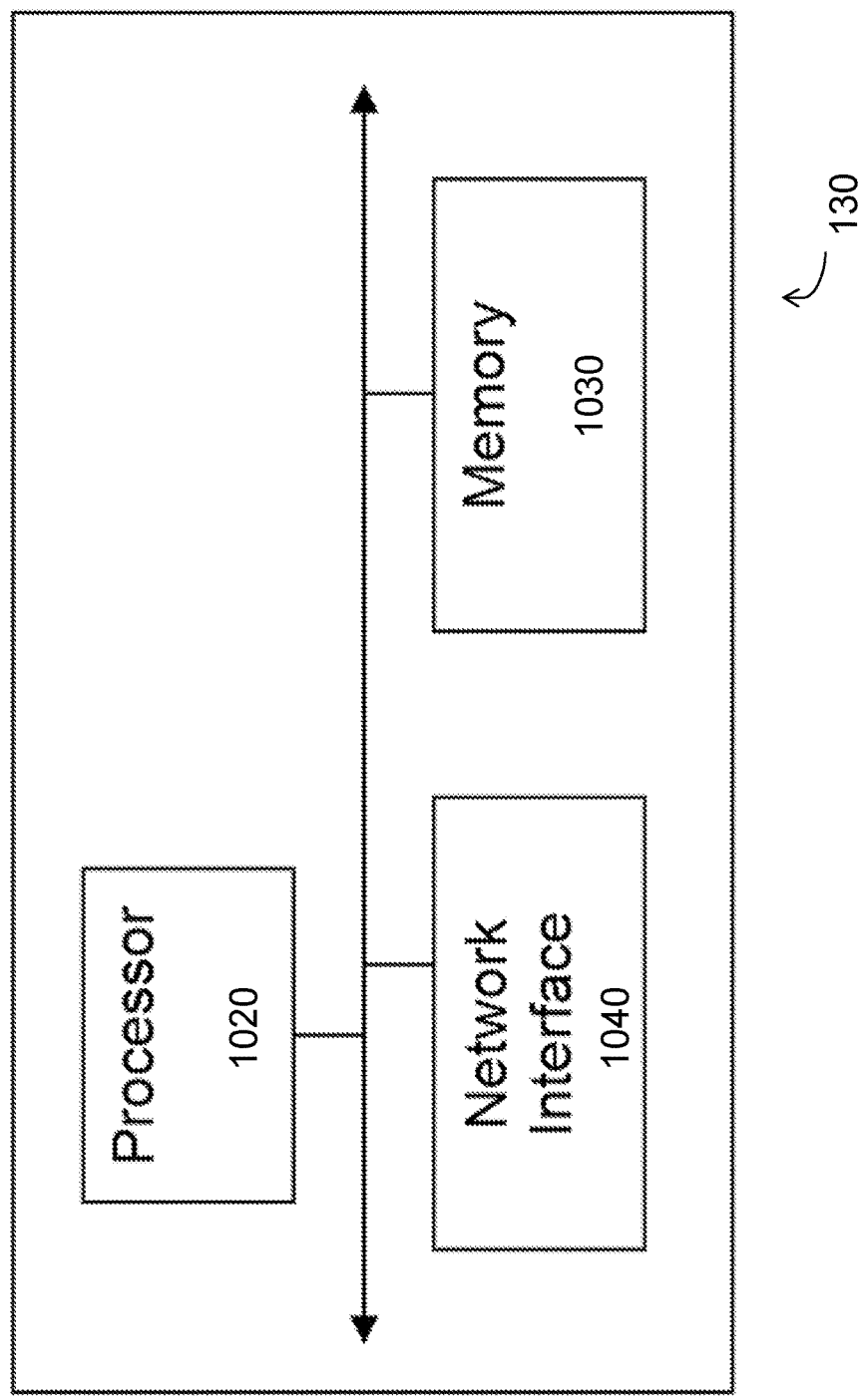
FIG. 10 is a block schematic of an exemplary radio network controller or core network node, in accordance with certain embodiments.

FIG. 10 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processor 1020, memory 1030, and network interface 1040. In some embodiments, processor 1020 executes instructions to provide some or all of the functionality described above as being provided by the network node, memory 1030 stores the instructions executed by processor 1020, and network interface 1040 communicates signals to any suitable node, such as a gateway, switch, router, Internet, Public Switched Telephone Network (PSTN), network nodes 115, radio network controllers or core network nodes 130, etc.

Processor 1020 may include any suitable combination of hardware and software implemented in one or more modules to execute instructions and manipulate data to perform some or all of the described functions of the radio network controller or core network node 130. In some embodiments, processor 1020 may include, for example, one or more computers, one or more central processing units (CPUs), one or more microprocessors, one or more applications, and/or other logic.

Memory 1030 is generally operable to store instructions, such as a computer program, software, an application including one or more of logic, rules, algorithms, code, tables, etc. and/or other instructions capable of being executed by a processor. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information.

In some embodiments, network interface 1040 is communicatively coupled to processor 1020 and may refer to any suitable device operable to receive input for the network node, send output from the network node, perform suitable processing of the input or output or both, communicate to other devices, or any combination of the preceding. Network interface 1040 may include appropriate hardware (e.g., port, modem, network interface card, etc.) and software, including protocol conversion and data processing capabilities, to communicate through a network.

Other embodiments of the network node may include additional components beyond those shown in FIG. 10 that may be responsible for providing certain aspects of the network node's functionality, including any of the functionality described above and/or any additional functionality (including any functionality necessary to support the solution described above).

Figure 11:
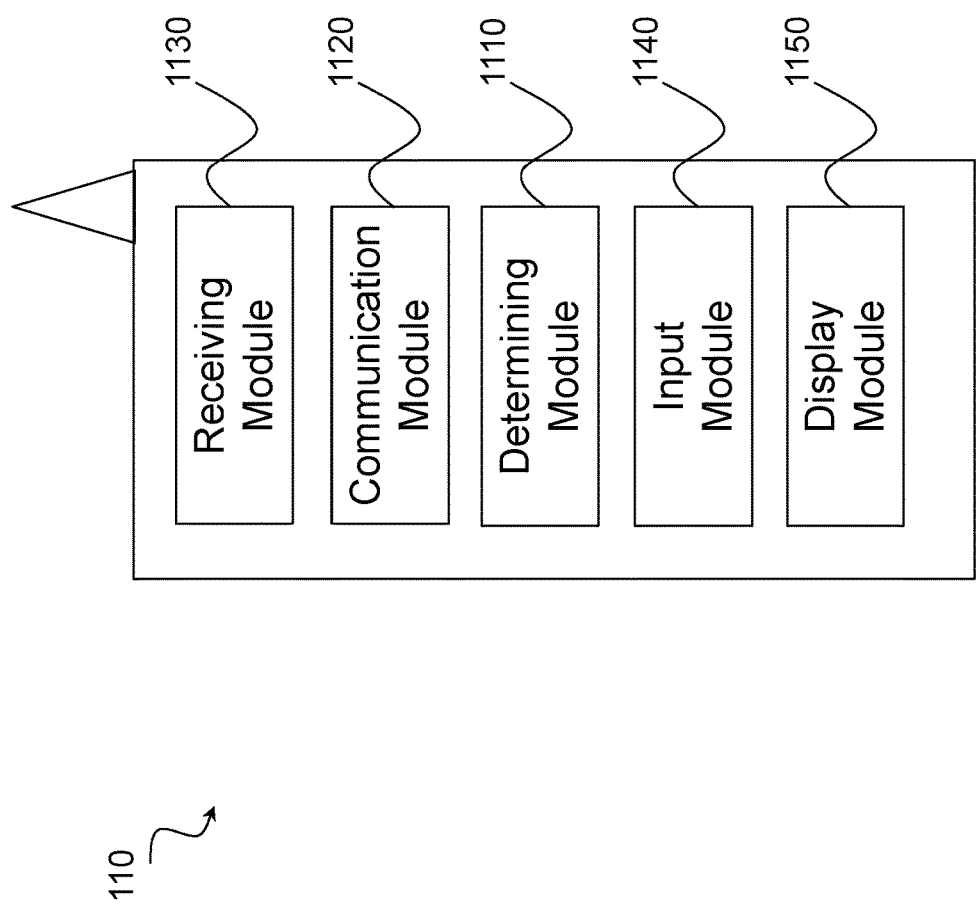
FIG. 11 is a block schematic of an exemplary wireless device, in accordance with certain embodiments.

FIG. 11 is a block schematic of an exemplary wireless device, in accordance with certain embodiments. Wireless device 110 may include one or more modules. For example, wireless device 110 may include a determining module 1110, a communication module 1120, a receiver module 1130, an input module 1140, a display module 1150, and any other suitable modules. Wireless device 110 may perform the methods for inter-carrier D2D resource allocation described above with respect to FIGS. 1-7.

Determining module 1110 may perform the processing functions of wireless device 110. For example, determining module 1110 may determine one or more time resources in a particular carrier from one or more pools of time resources for a sidelink operation by the wireless device. As another example, determining module 1110 may determine one or more time resources in a particular carrier from one or more pools of time resources for a sidelink transmission by the wireless device. As still another example, determining module 1110 may determine whether an uplink grant for scheduling an uplink transmission is received from a network node during a predefined period, the predefined period comprising a period of time preceding the sidelink transmission. As yet another example, determining module 1110 may abort a sidelink transmission. As yet another example, determining module 1110 may postpone the sidelink transmission to a later occasion, or select one or more different time resources from the one or more pools of time resources that would not collide with the uplink transmission scheduled by the network node.

Determining module 1110 may include or be included in one or more processors, such as processor 820 described above in relation to FIG. 8. Determining module 1110 may include analog and/or digital circuitry configured to perform any of the functions of determining module 1110 and/or processor 820 described above. The functions of determining module 1110 described above may, in certain embodiments, be performed in one or more distinct modules.

Communication module 1120 may perform the transmission functions of wireless device 110. For example, communication module 1120 may send a gap request message to a network node, the gap request message indicating one or more gaps requested by the wireless device, the one or more gaps comprising the determined one or more time resources for the sidelink operation. As another example, communication module 1120 may send capability information to the network node, the capability information indicating that the wireless device is capable of indicating one or more time resources in the particular carrier from the one or more pools of time resources for the sidelink operation by the wireless device. As still another example, communication module 1120 may send an indication to the network node that the wireless device is no longer using the requested one or more gaps. As yet another example, communication module 1120 may transmit a sidelink transmission. As yet another example, communication module 1120 may perform the uplink transmission scheduled by the uplink grant received from the network node. Communication module 1120 may transmit messages to one or more of network nodes 115 of network 100. Communication module 1120 may include a transmitter and/or a transceiver, such as transceiver 810 described above in relation to FIG. 8. Communication module 1120 may include circuitry configured to wirelessly transmit messages and/or signals. In particular embodiments, communication module 1120 may receive messages and/or signals for transmission from determining module 1110. In certain embodiments, the functions of communication module 1120 described above may be performed in one or more distinct modules. For example, in certain embodiments some functions of communications module 1120 may be performed by a selective transmission module.

Receiving module 1130 may perform the receiving functions of wireless device 110. As one example, receiving module 1130 may receive a positive acknowledgement from the network node, the positive acknowledgement indicating that the wireless device may proceed with the sidelink operation. As another example, receiving module 1130 may receive a negative acknowledgement from the network node, the negative acknowledgement indicating that the wireless device shall prioritize one or more uplink transmissions to the network node over the sidelink operation. As still another example, receiving module 1130 may receive a resource allocation configuration from the network node, the resource allocation configuration based at least in part on the one or more gaps requested by the wireless device in the gap request message. Receiving module 1130 may include a receiver and/or a transceiver, such as transceiver 810 described above in relation to FIG. 8. Receiving module 1130 may include circuitry configured to wirelessly receive messages and/or signals. In particular embodiments, receiving module 1130 may communicate received messages and/or signals to determining module 1110. Input module 1140 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1110.

Display module 1150 may present signals on a display of wireless device 110. Display module 1150 may include the display and/or any appropriate circuitry and hardware configured to present signals on the display. Display module 1150 may receive signals to present on the display from determining module 1110.

Determining module 1110, communication module 1120, receiving module 1130, input module 1140, and display module 1150 may include any suitable configuration of hardware and/or software. Wireless device 110 may include additional modules beyond those shown in FIG. 11 that may be responsible for providing any suitable functionality, including any of the functionality described above and/or any additional functionality (including any functionality necessary to support the various solutions described herein).

Figure 12:
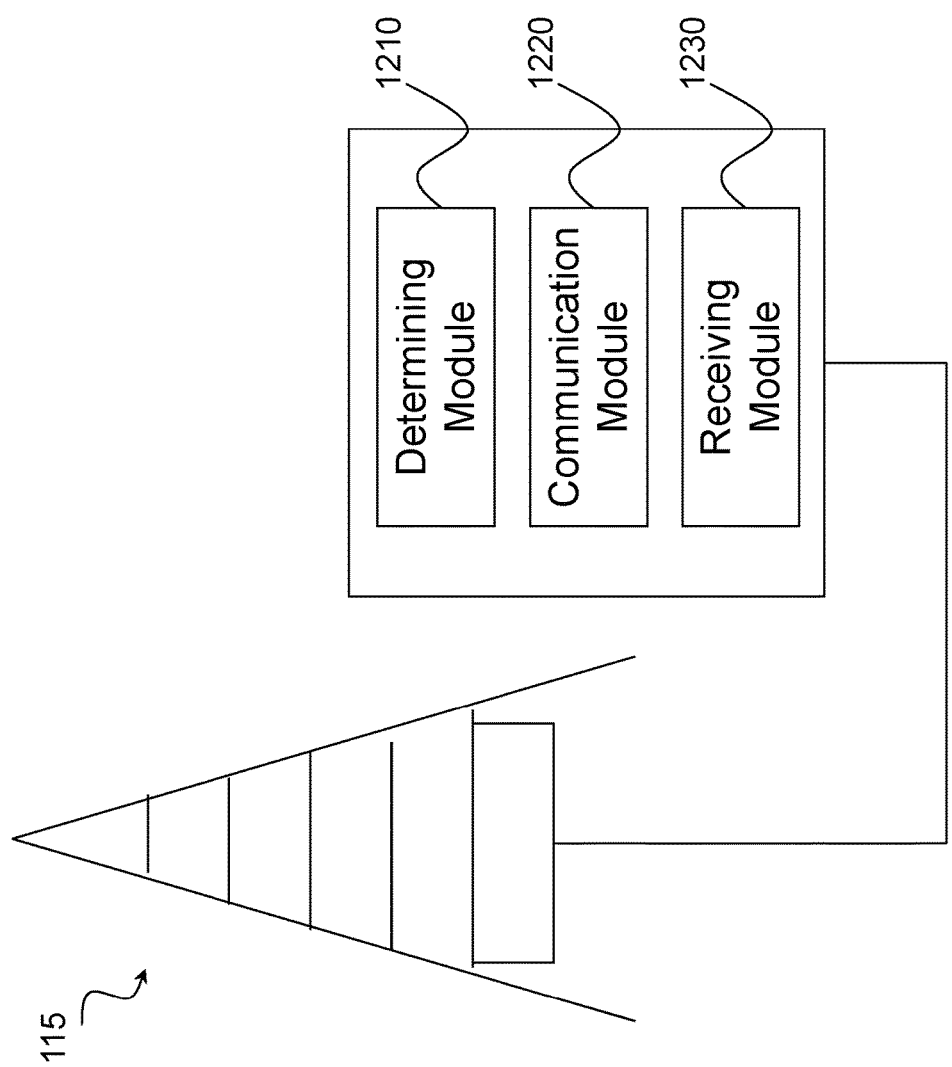
FIG. 12 is a block schematic of an exemplary network node, in accordance with certain embodiments.

FIG. 12 is a block schematic of an exemplary network node 115, in accordance with certain embodiments. Network node 115 may include one or more modules. For example, network node 115 may include determining module 1210, communication module 1220, receiving module 1230, and any other suitable modules. In some embodiments, one or more of determining module 1210, communication module 1220, receiving module 1230, or any other suitable module may be implemented using one or more processors, such as processor 920 described above in relation to FIG. 9. In certain embodiments, the functions of two or more of the various modules may be combined into a single module. Network node 115 may perform the methods for inter-carrier D2D resource allocation described above with respect to FIGS. 1-7.

Determining module 1210 may perform the processing functions of network node 115. As one example, determining module 1210 may determine an allocation of resources for the wireless device based at least in part on the one or more gaps indicated in the received gap request message. As another example, determining module 1210 may allocate resources for the wireless device according to the determined allocation of resources. As still another example, determining module 1210 may schedule resources on at least one carrier for the wireless device that would not collide with the one or more time resources selected for the sidelink operation by the wireless device. As yet another example, determining module 1210 may schedule resources to avoid resources preceding and following the one or more time resources selected for the sidelink operation by the wireless device. Determining module 1210 may include or be included in one or more processors, such as processor 920 described above in relation to FIG. 9. Determining module 1210 may include analog and/or digital circuitry configured to perform any of the functions of determining module 1210 and/or processor 920 described above. The functions of determining module 1210 may, in certain embodiments, be performed in one or more distinct modules. For example, in certain embodiments some of the functionality of determining module 1210 may be performed by an allocation module.

Communication module 1220 may perform the transmission functions of network node 115. As one example, communication module 1220 may send, in response to the gap request message from the wireless device, a positive acknowledgement indicating that the wireless device may proceed with the sidelink operation. As another example, communication module 1220 may send, in response to the gap request message from the wireless device, a negative acknowledgement indicating that the wireless device shall prioritize one or more uplink transmissions to the network node over the sidelink operation. As still another example, communication module 1220 may send a resource allocation configuration to the wireless device, the resource allocation configuration based at least in part on the one or more gaps requested by the wireless device in the gap request message. Communication module 1220 may transmit messages to one or more of wireless devices 110. Communication module 1220 may include a transmitter and/or a transceiver, such as transceiver 910 described above in relation to FIG. 9. Communication module 1220 may include circuitry configured to wirelessly transmit messages and/or signals. In particular embodiments, communication module 1220 may receive messages and/or signals for transmission from determining module 1210 or any other module.

Receiving module 1230 may perform the receiving functions of network node 115. For example, receiving module 1230 may receive a gap request message from a wireless device indicating one or more gaps requested by the wireless device, the one or more gaps comprising one or more time resources selected from one or more pools of time resources for a sidelink operation by the wireless device. As another example, receiving module 1230 may receive capability information from the wireless device, the capability information indicating that the wireless device is capable of indicating one or more time resources in the particular carrier from the one or more pools of time resources for the sidelink operation by the wireless device. As still another example, receiving module 1230 may receive an indication that the wireless device is no longer using the requested one or more gaps. Receiving module 1230 may receive any suitable information from a wireless device. Receiving module 1230 may include a receiver and/or a transceiver, such as transceiver 910 described above in relation to FIG. 9. Receiving module 1230 may include circuitry configured to wirelessly receive messages and/or signals. In particular embodiments, receiving module 1230 may communicate received messages and/or signals to determining module 1210 or any other suitable module.

Determining module 1210, communication module 1220, and receiving module 1230 may include any suitable configuration of hardware and/or software. Network node 115 may include additional modules beyond those shown in FIG. 12 that may be responsible for providing any suitable functionality, including any of the functionality described above and/or any additional functionality (including any functionality necessary to support the various solutions described herein).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
ACK Acknowledged
AP Access point
BS Base station
BSC Base station controller
BTS Base transceiver station
CA Carrier aggregation
CC Component carrier
D2D Device-to-device
DC Dual connectivity
DL Downlink
DRX Discontinuous reception
eNB eNodeB
FDD Frequency division duplex
ITS Intelligent transportation systems
LTE Long Term Evolution
M2M Machine to machine
MAC Media access control
MeNB Master eNode B
MME Mobility management entity
MSR Multi-standard radio
MTC Machine Type Communication
NACK Not acknowledged
OFDM Orthogonal frequency division multiplexing
ONC Out-of-Network Coverage
SI System Information
SL Sidelink
PLMN Public land mobile network
ProSe Proximity Services
QoS Quality of service
RAT Radio Access Technology
RF Radio frequency
RNC Radio Network Controller
RRC Radio resource control
RRH Remote radio head
RRU Remote radio unit
SeNB Secondary eNode B
SINR Signal to interference and noise ratio
SON Self-organizing networks
TDD Time division duplex
Tx Transmitter
UE User equipment
UL Uplink

The invention claimed is:

1. A method in a wireless device, comprising:
   determining one or more time frequency resources in a particular carrier from one or more pools of time frequency resources for a sidelink operation by the wireless device, wherein the one or more pools of time frequency resources comprise one or more pools of device-to-device (D2D) resources indicated by a serving eNodeB (eNB) associated with the wireless device; and
   sending a gap request message to the eNB, the gap request message indicating one or more gaps requested by the wireless device, the one or more gaps comprising the determined one or more time frequency resources for the sidelink operation.

2. The method of claim 1, further comprising receiving a positive acknowledgement from the eNB, the positive acknowledgement indicating that the wireless device may proceed with the sidelink operation.

3. The method of claim 1, further comprising receiving a negative acknowledgement from the eNB, the negative acknowledgement indicating that the wireless device shall prioritize one or more uplink transmissions to the eNB over the sidelink operation.

4. The method of claim 1, further comprising receiving a resource allocation configuration from the eNB, the resource allocation configuration based at least in part on the one or more gaps requested by the wireless device in the gap request message.

5. The method of claim 4, wherein the resource allocation configuration received from the eNB applies to the wireless device until otherwise indicated by the eNB.

6. The method of claim 1, wherein the sidelink operation by the wireless device comprises at least one of:
   receiving a sidelink transmission; and
   transmitting a sidelink transmission.

7. The method of claim 1, further comprising sending capability information to the eNB, the capability information indicating that the wireless device is capable of indicating one or more time frequency resources in the particular carrier from the one or more pools of time frequency resources for the sidelink operation by the wireless device.

8. The method of claim 1, further comprising sending an indication to the eNB that the wireless device is no longer using the requested one or more gaps.

9. The method of claim 1, wherein the gap request message is sent within a predefined time period preceding a repetition of at least one of the one or more pools of time frequency resources.

10. The method of claim 1, wherein:
    the one or more pools of time frequency resources for the sidelink operation are periodic; and
    the gap request message further comprises an index indicating the one or more resources from the one or more resource pools to be used by the wireless device in one or more subsequent sidelink periods.

11. The method of claim 1, wherein the gap request message further comprises
    a carrier to which the gap applies.

12. A method in a network node comprising an eNodeB (eNB), comprising:
    receiving a gap request message from a wireless device indicating one or more gaps requested by the wireless device, the one or more gaps comprising one or more time frequency resources in a particular carrier selected from one or more pools of time frequency resources for a sidelink operation by the wireless device, wherein the one or more pools of time frequency resources comprise one or more pools of device-to-device (D2D) resources indicated by the eNB to the wireless device; and
    determining an allocation of resources for the wireless device based at least in part on the one or more gaps indicated in the received gap request message.

13. The method of claim 12, further comprising receiving an indication that the wireless device is no longer using the requested one or more gaps.

14. The method of claim 12, wherein the gap request message is received within a predefined time window preceding a repetition of at least one of the one or more pools of time frequency resources.

15. The method of claim 12, wherein:
the pool of time frequency resources is periodic; and
the gap request message further comprises an index indicating the one or more resources from the one or more resource pools to be used by the wireless device in one or more subsequent sidelink periods.

16. The method of claim 12, wherein the gap request message further comprises
a carrier to which the gap applies.

17. The method of claim 12, further comprising sending, in response to the gap request message from the wireless device, a positive acknowledgement indicating that the wireless device may proceed with the sidelink operation.

18. The method of claim 12, further comprising sending, in response to the gap request message from the wireless device, a negative acknowledgement indicating that the wireless device shall prioritize one or more uplink transmissions to the network node over the sidelink operation.

19. The method of claim 12, further comprising:
allocating resources for the wireless device according to the determined allocation of resources, wherein allocating resources for the wireless device comprises one or more of:
sending a resource allocation configuration to the wireless device, the resource allocation configuration based at least in part on the one or more gaps requested by the wireless device in the gap request message;
scheduling resources on at least one carrier for the wireless device that would not collide with the one or more time frequency resources selected for the sidelink operation by the wireless device; and
scheduling resources to avoid resources preceding and following the one or more time frequency resources selected for the sidelink operation by the wireless device.

20. The method of claim 12, further comprising receiving capability information from the wireless device, the capability information indicating that the wireless device is capable of indicating one or more time frequency resources in the particular carrier from the one or more pools of time frequency resources for the sidelink operation by the wireless device.

21. A wireless device, comprising:
one or more processors, the one or more processors configured to:
determine one or more time frequency resources in a particular carrier from one or more pools of time frequency resources for a sidelink operation by the wireless device, wherein the one or more pools of time frequency resources comprise one or more pools of device-to-device (D2D) resources indicated by a serving eNodeB (eNB) associated with the wireless device; and
send a gap request message to the eNB, the gap request message indicating one or more gaps requested by the wireless device, the one or more gaps comprising the determined one or more time frequency resources for the sidelink operation.

22. The wireless device of claim 21, wherein the one or more processors are further configured to send an indication to the eNB that the wireless device is no longer using the requested one or more gaps.

23. The wireless device of claim 21, wherein the one or more processors are configured to send the gap request message within a predefined time period preceding a repetition of at least one of the one or more pools of time frequency resources.

24. The wireless device of claim 21, wherein:
the one or more pools of time frequency resources for the sidelink operation are periodic; and
the gap request message further comprises an index indicating the one or more resources from the one or more resource pools to be used by the wireless device in one or more subsequent sidelink periods.

25. The wireless device of claim 21, wherein the gap request message further comprises
a carrier to which the gap applies.

26. The wireless device of claim 21, wherein the one or more processors are further configured to receive a positive acknowledgement from the eNB, the positive acknowledgement indicating that the wireless device may proceed with the sidelink operation.

27. The wireless device of claim 21, wherein the one or more processors are further configured to receive a negative acknowledgement from the eNB, the negative acknowledgement indicating that the wireless device shall prioritize one or more uplink transmissions to the eNB over the sidelink operation.

28. The wireless device of claim 21, wherein the one or more processors are further configured to receive a resource allocation configuration from the eNB, the resource allocation configuration based at least in part on the one or more gaps requested by the wireless device in the gap request message.

29. The wireless device of claim 28, wherein the resource allocation configuration applies to the wireless device until otherwise indicated by the eNB.

30. The wireless device of claim 21, wherein the sidelink operation by the wireless device comprises at least one of:
receiving a sidelink transmission; and
transmitting a sidelink transmission.

31. The wireless device of claim 21, wherein the one or more processors are further configured to send capability information to the eNB, the capability information indicating that the wireless device is capable of indicating one or more time frequency resources in the particular carrier from the one or more pools of time frequency resources for the sidelink operation by the wireless device.

32. A network node comprising an eNodeB (eNB), comprising:
one or more processors, the one or more processors configured to:
receive a gap request message from a wireless device indicating one or more gaps requested by the wireless device, the one or more gaps comprising one or more time frequency resources in a particular carrier selected from one or more pools of time frequency resources for a sidelink operation by the wireless device, wherein the one or more pools of time frequency resources comprise one or more pools of device-to-device (D2D) resources indicated by the eNB to the wireless device; and
determine an allocation of resources for the wireless device based at least in part on the one or more gaps indicated in the received gap request message.

33. The network node of claim 32, wherein the one or more processors are further configured to send, in response to the gap request message from the wireless device, a positive acknowledgement indicating that the wireless device may proceed with the sidelink operation.

34. The network node of claim 32, wherein the one or more processors are further configured to send, in response to the gap request message from the wireless device, a negative acknowledgement indicating that the wireless device shall prioritize one or more uplink transmissions to the network node over the sidelink operation.

35. The network node of claim 32, wherein the one or more processors are further configured to:
allocate resources for the wireless device according to the determined allocation of resources, wherein allocating resources for the wireless device the one or more processors are configured to perform one or more of:
send a resource allocation configuration to the wireless device, the resource allocation configuration based at least in part on the one or more gaps requested by the wireless device in the gap request message;
schedule resources on at least one carrier for the wireless device that would not collide with the one or more time frequency resources selected for the sidelink operation by the wireless device; and
schedule resources to avoid resources preceding and following the one or more time frequency resources selected for the sidelink operation by the wireless device.

36. The network node of claim 32, wherein the one or more processors are further configured to receive capability information from the wireless device, the capability information indicating that the wireless device is capable of indicating one or more time frequency resources in the particular carrier from the one or more pools of time frequency resources for the sidelink operation by the wireless device.

37. The network node of claim 32, wherein the one or more processors are further configured to receive an indication that the wireless device is no longer using the requested one or more gaps.

38. The network node of claim 32, wherein the one or more processors are configured to receive the gap request message within a predefined time window preceding a repetition of at least one of the one or more pools of time frequency resources.

39. The network node of claim 32, wherein:
the pool of time frequency resources is periodic; and
the gap request message further comprises an index indicating the one or more resources from the one or more resource pools to be used by the wireless device in one or more subsequent sidelink periods.

40. The network node of claim 32, wherein the gap request message further comprises
a carrier to which the gap applies.

* * * * *